US012804024B2

(12) United States Patent
Chen

(10) Patent No.: US 12,804,024 B2
(45) Date of Patent: Nov. 17, 2026

(54) DATA PROCESSING METHOD AND APPARATUS OF ONLINE MEETINGS, DEVICE, MEDIUM, AND PRODUCT

(71) Applicant: TENCENT TECHNOLOGY (SHENZHEN) COMPANY LIMITED, Shenzhen (CN)

(72) Inventor: Chunyong Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 29 days.

(21) Appl. No.: 18/584,610

(22) Filed: Feb. 22, 2024

(65) Prior Publication Data

US 2024/0195852 A1 Jun. 13, 2024

Related U.S. Application Data

(63) Continuation of application No. PCT/CN2023/097930, filed on Jun. 2, 2023.

(30) Foreign Application Priority Data

Aug. 12, 2022 (CN) ........................ 202210970149.7

(51) Int. Cl.
*H04L 65/1069* (2022.01)
*G10L 15/183* (2013.01)
(Continued)

(52) U.S. Cl.
CPC .......... *H04L 65/403* (2013.01); *G10L 15/183* (2013.01); *H04L 65/1069* (2013.01); *G10L 15/02* (2013.01); *G10L 15/30* (2013.01)

(58) Field of Classification Search
CPC ... H04L 65/1069; H04L 65/403; G10L 15/02; G10L 15/30; G10L 15/183
(Continued)

(56) References Cited

U.S. PATENT DOCUMENTS

2011/0271212 A1* 11/2011 Jones .................... H04M 3/567
715/753
2013/0290870 A1 10/2013 Jones et al.
(Continued)

FOREIGN PATENT DOCUMENTS

| | | | |
|---|---|---|---|
| CN | 102469220 | A | 5/2012 |
| CN | 110769189 | A | 2/2020 |
| CN | 113220387 | A | 8/2021 |

OTHER PUBLICATIONS

The World Intellectual Property Organization (WIPO) International Search Report for PCT/CN2023/097930 Jul. 12, 2023 9 Pages (including translation).

*Primary Examiner* — Glenford J Madamba
(74) *Attorney, Agent, or Firm* — ANOVA LAW GROUP, PLLC

(57) ABSTRACT

This application discloses a data processing method and apparatus of online meetings, a device, a medium, and a product, and belongs to the field of online meeting technologies. The method includes joining at least two online meetings using a same user account in an online meeting client; determining a presentation mode corresponding to each of the at least two online meetings, the presentation mode comprising at least one of a visual mode and an audio mode; and presenting meeting content of each online meeting, and no more than one of the at least two online meetings presenting in the audio mode.

14 Claims, 15 Drawing Sheets

(51) Int. Cl.

| | |
|---|---|
| ***H04L 65/403*** | (2022.01) |
| *G10L 15/02* | (2006.01) |
| *G10L 15/30* | (2013.01) |

(58) Field of Classification Search

USPC .......................................................... 709/204

See application file for complete search history.

(56) References Cited

U.S. PATENT DOCUMENTS

| | | | | |
|---|---|---|---|---|
| 2018/0337968 | A1* | 11/2018 | Faulkner | H04L 51/046 |
| 2021/0258427 | A1* | 8/2021 | Lee | H04L 12/1831 |
| 2023/0137043 | A1* | 5/2023 | Swerdlow | H04L 12/1822 709/204 |

* cited by examiner

DATA PROCESSING METHOD AND APPARATUS OF ONLINE MEETINGS, DEVICE, MEDIUM, AND PRODUCT

RELATED APPLICATIONS

This application is a continuation of PCT Application No. PCT/CN2023/097930, filed on Jun. 2, 2023, which claims priority to Chinese Patent Application No. 202210970149.7, filed on Aug. 12, 2022 and entitled "MEETING CONTENT PRESENTATION METHOD AND APPARATUS OF ONLINE MEETINGS, DEVICE, MEDIUM, AND PRODUCT." The two applications are both incorporated herein by reference in their entirety.

FIELD OF THE TECHNOLOGY

Embodiments of this application relate to the field of online meeting technologies, and in particular, to a data processing method and apparatus of online meetings, a device, a medium, and a product.

BACKGROUND OF THE DISCLOSURE

Online meetings have emerged with the continuous development of network and streaming media technology. Compared with conventional meetings, meeting attendees can log in to terminals using accounts to join online meetings at any location without arriving at designated meeting places in advance.

In the related art, a meeting attendee makes a request for joining an online meeting by inputting a meeting number. The meeting attendee can join the online meeting if the online meeting has already started. Different meeting attendees can be displayed in an online meeting interface.

A meeting attendee can only join one online meeting using one account at a time. In this case, when a meeting attendee needs to join a plurality of online meetings at the same time, the meeting attendee can only choose to join one of the online meetings, which reduces the attendance efficiency and affects the progress of the online meetings.

SUMMARY

This application provides a data processing method and apparatus of online meetings, a device, a medium, and a product, and includes technical solutions as follows:

One aspect of this application provides a data processing method of online meetings. The method includes joining at least two online meetings using a same user account in an online meeting client; determining a presentation mode corresponding to each of the at least two online meetings, the presentation mode comprising at least one of a visual mode and an audio mode; and presenting meeting content of each online meeting, and no more than one of the at least two online meetings presenting in the audio mode.

Another aspect of this application provides a data processing method of online meetings, the method being performed by a computer device, and the method including receiving a request of joining at least two online meetings using a same user account in an online meeting client; and pushing meeting content of each of the at least two online meetings to the online meeting client based on presentation modes corresponding to the at least two online meetings, the presentation mode comprising at least one of a visual mode and an audio mode, and for no more than one of the at least two online meetings, the presentation mode comprising the audio mode.

According to another aspect of this application, a non-transitory computer-readable storage medium is provided, storing at least one computer program, the at least one computer program being loaded and executed by a processor to implement the data processing method of online meetings according to the foregoing aspect.

The technical solutions provided in this application provide at least the following beneficial effects.

At least two online meetings are joined using the same user account in an online meeting client; and meeting content of each online meeting is presented in a presentation mode corresponding to each of the at least two online meetings. In this application, at least two online meetings are joined using the same user account, and the meeting content of each online meeting is presented in the online meeting client based on the presentation mode corresponding to each online meeting. In embodiments of the present application, a meeting attendee can join a plurality of online meetings at the same time based on the foregoing method, which increases the attendance efficiency and does not affect the progress of the online meetings.

DESCRIPTION OF EMBODIMENTS

Figure 1:
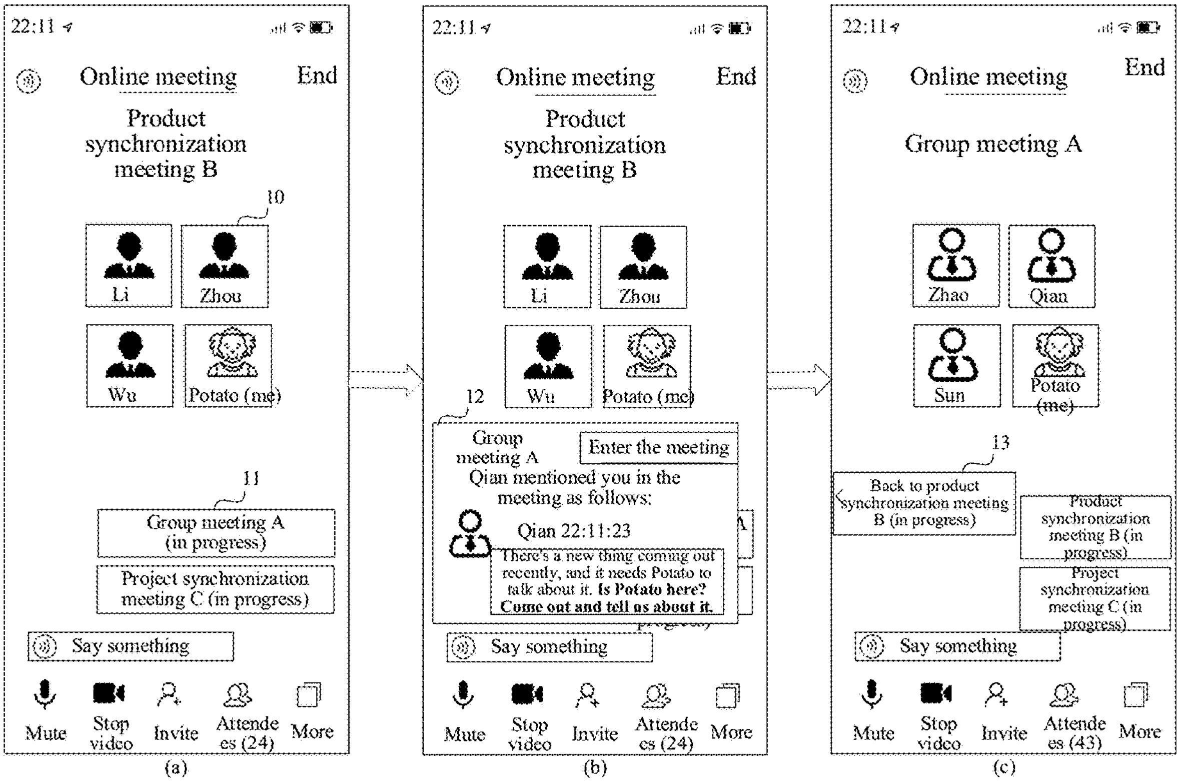
FIG. 1 is a schematic diagram of a data processing method of online meetings according to an embodiment of this application.

An embodiment of this application provides a schematic diagram of a data processing method for online meetings. As shown in FIG. 1, the method may be performed by a terminal in a computer device, and an online meeting client is installed on the terminal.

For example, at least two online meetings are joined using the same user account in the online meeting client;

a presentation mode corresponding to each of the at least two online meetings is determined in the online meeting client; and meeting content of each online meeting is presented.

For example, the presentation mode corresponding to at most one of the at least two online meetings include an audio mode.

In some embodiments, an online meeting corresponding to the audio mode in the at least two online meetings includes any one or more of the following:

the first joined online meeting, the first online meeting of the at least two online meetings that is joined using the same user account;

the last joined online meeting, the last online meeting of the at least two online meetings that is joined using the same user account;

an online meeting designated or selected by a human-computer interaction operation, for example, an online meeting B, in the at least two online meetings joined using the same user account, designated to present meeting content in the audio mode;

an online meeting only in which there is a speaker at the same time, for example, an online meeting, in the at least two online meetings joined using the same user account, only in which there is a speaker at the same time, and presenting meeting content in the audio mode, where meeting content of a first online meeting and meeting content of a second online meeting are presented in a split-screen form, and the presentation of the meeting content of the online meeting only in which there is a speaker at the same time in the audio mode can highlight the online meeting in which there is currently a speaker;

an online meeting whose current meeting content includes content of interest to the user account, where the current meeting, in the at least two online meetings joined using the same user account, presents the meeting content in the audio mode when the current meeting content includes the content of interest to the user account; and in some embodiments, the content of interest is at least one of meeting content determined based on a tag preset by a meeting attendee, meeting content predicted by artificial intelligence, meeting content determined based on a tag of the user account, meeting content determined based on a historical attendance record of the user account, and meeting content determined based on a level of the user account of the meeting attendee, but is not limited thereto, and this is not specifically limited in the embodiments of this application; and an online meeting whose current meeting content mentions a meeting attendee corresponding to the user account, where the current meeting, in the at least two online meetings joined using the same user account, presents the meeting content in the audio mode when the current meeting content mentions the meeting attendee corresponding to the user account.

In some embodiments, the online meeting client is any one of a program client and a web client, but is not limited thereto. This is not specifically limited in the embodiments of this application.

In some embodiments, the same user account is one account, or associated accounts with an association relationship are considered as one account, but is not limited thereto. This is not specifically limited in the embodiments of this application.

In some embodiments, the at least two online meetings are at least two online meetings with the same meeting time or at least two online meetings with intersecting meeting time, but are not limited thereto. This is not specifically limited in the embodiments of this application.

In some embodiments, the presentation mode is a presentation mode of meeting content of an online meeting. For example, the presentation mode includes at least one of a visual mode and an audio mode.

In some embodiments, the visual mode is of meeting content that is recognizable by sight, for example, at least one of video content, image content, and text content, but is not limited thereto. This is not specifically limited in the embodiments of this application.

In some embodiments, the audio mode is of meeting content that is recognizable by hearing, for example, audio content.

In some embodiments, the audio content is audio content of a single voice chat, audio content of an attendee presenting PPT content, audio content of an attendee presenting image content, or audio content of an attendee presenting silent video content, but is not limited thereto. This is not specifically limited in the embodiments of this application.

In some embodiments, the visual mode includes at least one of the following:

displaying meeting material, where the meeting material is meeting content presented by a meeting attendee at an online meeting, for example, at least one of PPT content, image content, and video content that are presented by the attendee, but is not limited thereto, and this is not specifically limited in the embodiments of this application;

displaying a video of a meeting attendee, where the video of the meeting attendee is a real-time meeting video of the meeting attendee;

displaying speech content text of a speaker in the online meeting, where the speech content text is obtained by a speech-to-text transcription technology; and displaying conversation content of the online meeting, where the conversation content is conversation content of meeting attendees in a chat box.

In one embodiment, the at least two online meetings include the first online meeting and the second online meeting; the meeting content of the first online meeting is presented in a meeting interface based on the presentation mode corresponding to the first online meeting; and the meeting content of the second online meeting is presented in the meeting interface based on the presentation mode corresponding to the second online meeting in a case that the second online meeting meets a preset condition.

For example, as shown in FIG. 1, three online meetings are joined using the same user account in an online meeting client, which are a group meeting A, a product synchronization meeting B, and a project synchronization meeting C respectively. As shown in (a) of FIG. 1, meeting content of the "product synchronization meeting B" is presented in a meeting interface based on a visual mode and an audio mode corresponding to the "product synchronization meeting B", that is, a video picture 10 and audio of an attendee in the "product synchronization meeting B" are displayed in the meeting interface. Meeting identifiers 11 of the "group meeting A" and the "project synchronization meeting C" are displayed in the "product synchronization meeting B". The online meeting corresponding to the meeting identifier 11 is displayed in the meeting interface through switching in response to a selection operation on the meeting identifier 11.

As shown in (b) of FIG. 1, when meeting content of the "group meeting A" mentions a meeting attendee "Potato" corresponding to the user account, the meeting content of the "group meeting A" is displayed in a bubble form 12 in the meeting interface of the "product synchronization meeting B", and associated meeting content that mentions the meeting attendee "Potato" corresponding to the user account is highlighted.

As shown in (c) of FIG. 1, the meeting content of the "group meeting A" is displayed in the online meeting client in response to a selection operation on the meeting content of the "group meeting A", that is, a video picture and audio of an attendee in the "group meeting A" are displayed in the meeting interface.

In some embodiments, in response to the selection operation on the meeting content of the "group meeting A", the meeting content of the "group meeting A" is displayed in the online meeting client, and a quick switch identifier 13 corresponding to the "product synchronization meeting B" is also displayed at the same time. The meeting content of the "product synchronization meeting B" is displayed in the online meeting client through switching by triggering the quick switch identifier 13, that is, the video picture and the audio of the attendee in the "product synchronization meeting B" are displayed in the meeting interface.

Based on the above, by the method provided in this embodiment, at least two online meetings are joined using the same user account in an online meeting client; and meeting content of each online meeting is presented in a presentation mode corresponding to each of the at least two online meetings. In this application, at least two online meetings are joined using the same user account, and the meeting content of each online meeting is presented in the online meeting client based on the presentation mode corresponding to each online meeting. The problem that a meeting attendee cannot join a plurality of online meetings at the same time is resolved based on the foregoing method, which increases the attendance efficiency and does not affect the progress of the online meetings.

Figure 2:
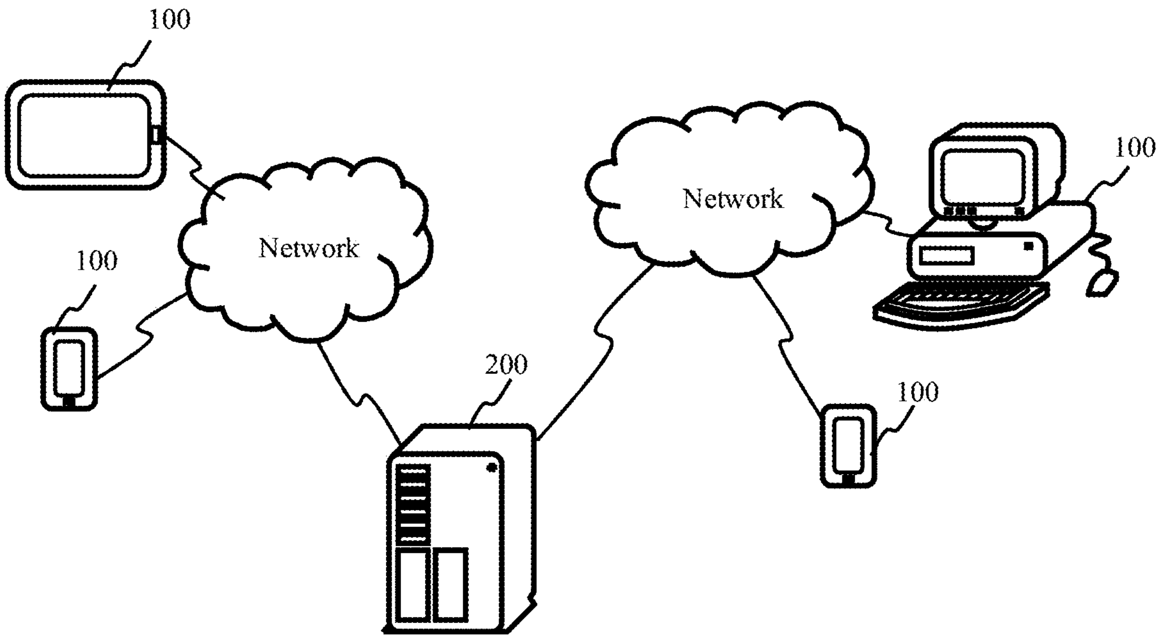
FIG. 2 is a schematic diagram of an architecture of a computer system according to an embodiment of this application.

FIG. 2 is a schematic diagram of an architecture of a computer system according to an embodiment of this application. The computer system may include a terminal 100 and a server 200.

The terminal 100 may be an electronic device such as a smartphone, a tablet computer, an on-board terminal (in-vehicle computer), a wearable device, a personal computer (PC), an intelligent voice interaction device, a smart home appliance, an on-board terminal, an aerial vehicle, or an unmanned vending terminal. A client that runs a target application may be installed in terminal 100. The target application may be an application using which online meetings can be joined, or may be another application that provides a function of joining online meetings, such as an instant messaging (IM) application. This is not limited in this application. In addition, the form of the target application is not limited in this application, including but not limited to an application (App) or a mini program installed in the terminal 100, and a web page form.

The server 200 may be an independent physical server, or may be a server cluster or distributed system including a plurality of physical servers, or may be a cloud server providing basic cloud computing services such as cloud servers of cloud computing services, cloud databases, cloud computing, cloud functions, cloud storage, network services, cloud communication, middleware services, domain name services, security services, content delivery networks (CDNs), and big data and artificial intelligence platforms. The server 200 may be a back end server of the target application for providing back end services to the client of the target application.

Cloud technology refers to hosting technology that unifies a series of resources such as hardware, software, and network in a wide area network or a local area network, to achieve data computing, storage, processing, and sharing. The cloud technology, a general term for network technology, information technology, integration technology, management platform technology, and application technology that are applied based on a business mode of cloud computing, can form a resource pool and can be used on demand, which is flexible and convenient. Cloud technology becomes an important support. Back end services of a technical network system require massive computing and storage resources, such as video websites, image websites, and more portals. With the high development and application of the Internet industry, each item in the future may have its own identification mark, and needs to be transmitted to a back end system for logical processing. Different levels of data are processed separately, and all types of industry data require strong system backing, which can only be achieved through cloud computing.

In some embodiments, the server may be implemented as a node in a blockchain system. Blockchain is a new application mode of computer technologies such as distributed data storage, peer-to-peer transmission, consensus mechanisms, and encryption algorithms. The blockchain, essentially a decentralized database, is a string of associated data blocks generated by a cryptographic method. Each data block includes information about a batch of network transactions, for verifying the validity (anti-counterfeiting) of the information and generating a next block. The blockchain may include a blockchain underlying platform, a platform product service layer, and an application service layer.

The terminal 100 may communicate with the server 200 through a network, for example, a wired or wireless network.

In the data processing method of online meetings provided in the embodiments of this application, steps may be performed by a computer device. The computer device is an electronic device having data computing, processing, and storage capabilities. Using an implementation environment of the solution shown in FIG. 2 as an example, the data processing method of online meetings may be performed by the terminal 100 (for example, a client that runs a target application is installed in the terminal 100 to perform the data processing method of online meetings), or the data processing method of online meetings may be performed by the server 200, or may be performed by the terminal 100 and the server 200 interactively and cooperatively. This is not limited in this application.

Figure 3:
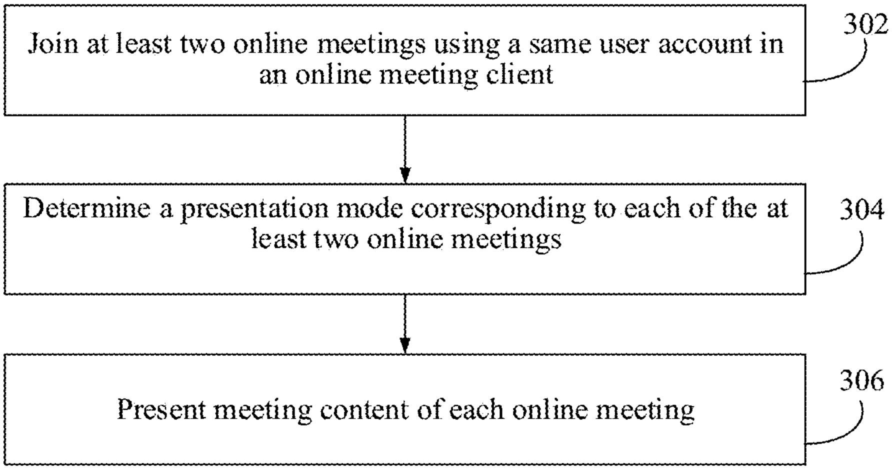
FIG. 3 is a flowchart of a data processing method of online meetings according to an embodiment of this application.

FIG. 3 is a flowchart of a data processing method of online meetings according to an embodiment of this application. The method may be performed by a computer device. The computer device may be terminal 100 or the server 200 in FIG. 2. An online meeting client is installed on terminal 100. The method includes the following steps:

Step 302: Join at least two online meetings using a same user account in an online meeting client.

For example, an online meeting is a network meeting joined by a meeting attendee at any location by logging in to the online meeting client using an account.

In some embodiments, the online meeting client is any one of a program client and a web client, but is not limited thereto. This is not specifically limited in the embodiments of this application.

In some embodiments, the same user account is one account, or at least two associated accounts with an association relationship are considered as one account, but is not limited thereto. This is not specifically limited in the embodiments of this application.

In some embodiments, the at least two online meetings are at least two online meetings with the same meeting time or at least two online meetings with intersecting meeting time, but are not limited thereto. This is not specifically limited in the embodiments of this application. For example, a meeting state of the online meeting joined using the user account is an online meeting that has already started or an online meeting in a meeting preparation phase. The online meeting in the meeting preparation phase has start time designated based on a human-computer interaction operation or is converted to the online meeting that has already started when a quantity of meeting attendees exceeds a preset quantity threshold.

Step 304: Determine a presentation mode corresponding to each of the at least two online meetings.

The presentation mode includes at least one of a visual mode and an audio mode, and the presentation mode corresponding to at most one of the at least two online meetings includes the audio mode.

For example, at least two online meetings include an online meeting A and an online meeting B. In the online meeting client, the online meeting A presents meeting content of the online meeting A in a presentation mode corresponding to the online meeting A, and the online meeting B presents meeting content of the online meeting B in a presentation mode corresponding to the online meeting B. For example, the audio mode includes, but is not limited to, at least one of a microphone sound of at least one meeting attendee, an audio file played by at least one meeting attendee, and an audio track sound of a video file played by at least one meeting attendee in the online meeting. For example, the visual mode includes, but is not limited to, at least one of a camera picture of at least one meeting attendee, a video file played by at least one meeting attendee, and a real-time picture shared by at least one meeting attendee in the online meeting.

In some embodiments, the presentation mode corresponding to the online meeting A and the presentation mode corresponding to the online meeting B may be the same or may be different. This is not specifically limited in the embodiments of this application.

Step 306: Present meeting content of each online meeting.

For example, in the online meeting client, meeting content of each online meeting is presented in a presentation mode corresponding to each of the at least two online meetings.

Based on the above, by the method provided in this embodiment, at least two online meetings are joined using the same user account in an online meeting client; and meeting content of each online meeting is presented in a presentation mode corresponding to each of the at least two online meetings. In this application, the at least two online meetings are joined using the same user account, and the meeting content of each online meeting is presented in the online meeting client based on the presentation mode corresponding to each online meeting. The problem that a meeting attendee cannot join a plurality of online meetings at the same time is resolved based on the foregoing method, which increases the attendance efficiency and does not affect the progress of the online meetings.

Figure 4:
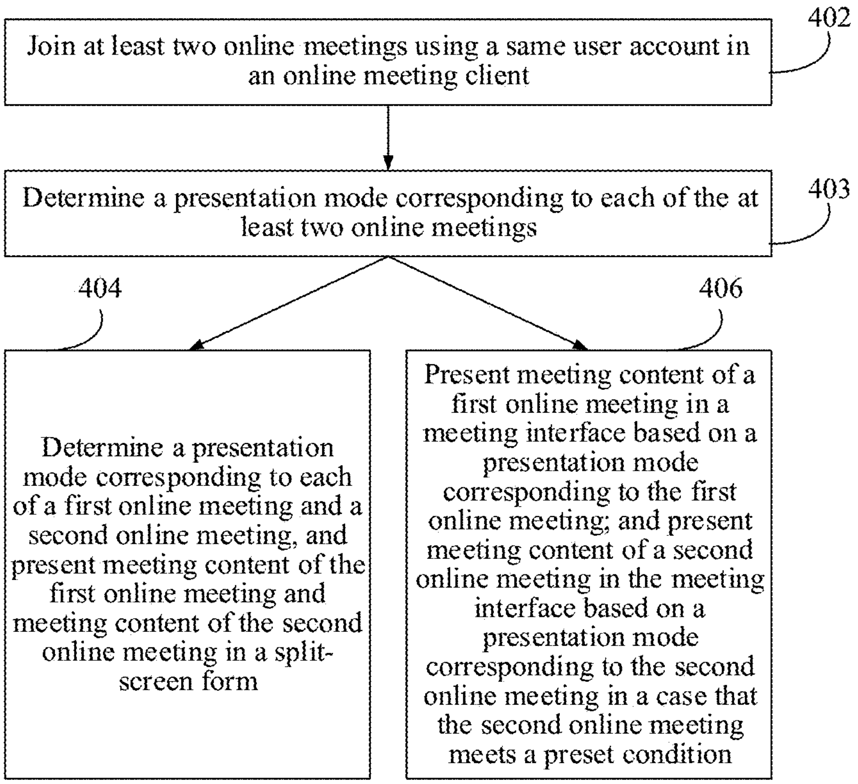
FIG. 4 is a flowchart of a data processing method of online meetings according to an embodiment of this application.

FIG. 4 is a flowchart of a data processing method of online meetings according to an embodiment of this application. The method may be performed by a computer device. The computer device may be terminal 100 or the server 200 in FIG. 2. An online meeting client is installed on terminal 100. The method includes the following steps:

Step 402: Join at least two online meetings using the same user account in an online meeting client.

For example, meeting content of each online meeting is presented in a presentation mode corresponding to each of the at least two online meetings. The presentation mode corresponding to at most one of the at least two online meetings includes an audio mode.

Step 403: Determine a presentation mode corresponding to each of the at least two online meetings.

In some embodiments, an online meeting corresponding to the audio mode in the at least two online meetings includes any one or more of the following:

- the first joined online meeting, the first online meeting of the at least two online meetings that is joined using the same user account;
- the last joined online meeting, the last online meeting of the at least two online meetings that is joined using the same user account;
- an online meeting designated or selected by a human-computer interaction operation, for example, an online meeting B, in the at least two online meetings joined using the same user account, designated to present meeting content in the audio mode;
- an online meeting in which there is a speaker at the same instance, for example, an online meeting, in the at least two online meetings joined using the same user account, in which there is a speaker at the same instance, and presenting meeting content in the audio mode, where meeting content of a first online meeting and meeting content of a second online meeting are presented in a split-screen form, and the presentation of the meeting content of the online meeting only in which there is a speaker at the same time in the audio mode can highlight the online meeting in which there is currently a speaker;

an online meeting whose current meeting content includes content of interest to the user account, where the current meeting, in the at least two online meetings joined using the same user account, presents the meeting content in the audio mode when the current meeting content includes the content of interest to the user account;

for example, the content of interest may be an attendee of interest in the online meeting; for example, when the attendee of interest provides the visual mode and/or audio mode, the online meeting corresponding to the attendee of interest is determined as the online meeting including the content of interest to the user account; for example, the attendee of interest may be designated or selected based on a human-computer interaction operation, or may be determined based on the user account; for example, an intimate user account that has an intimate relationship with the user account is determined as an account of interest, and there is a correspondence between the account of interest and the attendee of interest;

for example, the content of interest may be an auditory keyword and/or a visual keyword; for example, when the presentation mode of the online meeting provides the auditory keyword and/or the visual keyword, the online meeting is determined as the online meeting including the content of interest to the user account; for example, the auditory keyword and/or the visual keyword may be designated or selected based on a human-computer interaction operation, or may be determined based on note information from the user account for the online meeting; and the content of interest to the user account may be the same or different in different online meetings, and the user account may determine different content of interest for different online meetings; and an online meeting whose current meeting content mentions a meeting attendee corresponding to the user account, where the current meeting, in the at least two online meetings joined using the same user account, presents the meeting content in the audio mode when the current meeting content mentions the meeting attendee corresponding to the user account; and for example, a method of mentioning the user account includes, but is not limited to, the speaker of the online meeting presenting, in the audio mode, at least one of an account identifier of the user account, an account nickname, and a preset name noted by the user account; and the online meeting presenting, in the visual mode, at least one of an account identifier of the user account, an account nickname, and a preset name noted by the user account.

In this embodiment, there is usually one audio mode for presenting one online meeting. There may also be are audio modes for presenting two or more online meetings. Further, when there are audio modes for presenting two online meetings, different online meetings may be presented in the audio modes through different sound channels of an audio playing device. For example, if the audio playing device is a headphone device, a left sound channel of the headphone device is for playing the audio mode of a first online meeting, and a right sound channel of the headphone device is for playing the audio mode of a second online meeting.

In some embodiments, the visual mode includes at least one of the following:

displaying meeting material, where the meeting material is meeting content presented by a meeting attendee at an online meeting, for example, at least one of PPT content, image content, and video content that are presented by the attendee, and document content presented in the visual mode, such as text and tables, but is not limited thereto, and this is not specifically limited in the embodiments of this application;

displaying a video of a meeting attendee, where the video of the meeting attendee is a real-time meeting video of the meeting attendee;

displaying speech content text of a speaker in the online meeting, where the speech content text is obtained by a speech-to-text transcription technology; further, the speech content text of the speaker may be displayed as real-time subtitles and/or a meeting minutes document, and a display manner of the speech content text is not limited in this embodiment; and displaying conversation content of the online meeting, where the conversation content is conversation content of meeting attendees in a chat box.

Step 404: Determine a presentation mode corresponding to each of the first online meeting and the second online meeting, and present meeting content of the first online meeting and meeting content of the second online meeting in a split-screen form.

The split-screen form is to display two split-screen regions in the online meeting client and display meeting content of an online meeting in each split-screen region.

For example, the meeting content of the first online meeting is presented in the visual mode in a first split-screen region in the online meeting client, and the meeting content of the second online meeting is presented in the visual mode in a second split-screen region.

Figure 5:
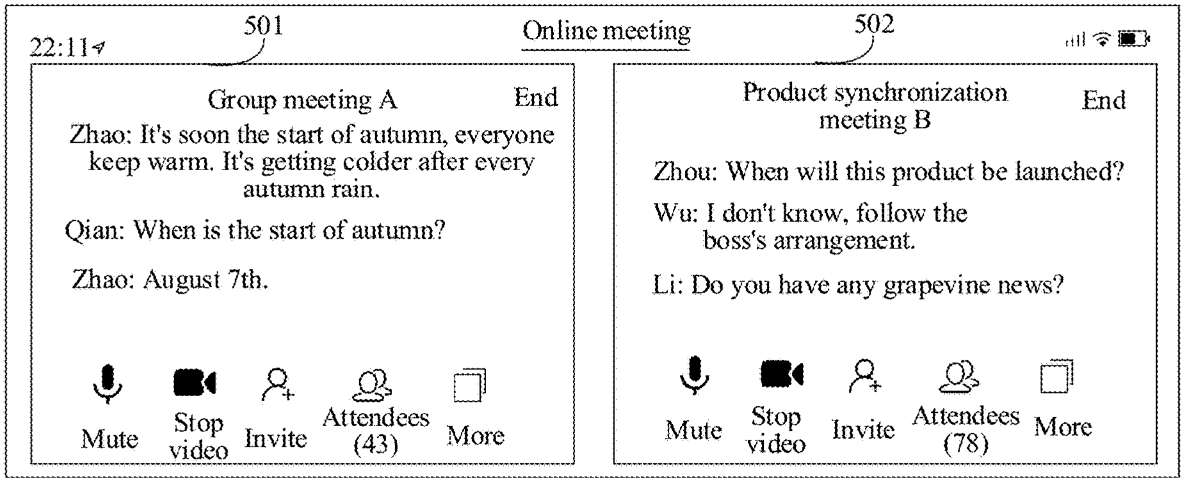
FIG. 5 is a schematic diagram of a data processing method of online meetings according to an embodiment of this application.

For example, FIG. 5 is a schematic diagram of a method for presenting meeting content of online meetings. An online meeting client includes a first split-screen region 501 and a second split-screen region 502. The first online meeting is a "group meeting A", and a second online meeting is a "product synchronization meeting B". A visual mode is a text form. Meeting content of the "group meeting A" is presented in the first split-screen region 501 in the text form, and at the same time, meeting content of the "product synchronization meeting B" is presented in the second split-screen region 502 in the text form. That is, a meeting attendee of the online meetings can view the meeting content of the two online meetings in the online meeting client at the same time.

For example, the meeting content of the first online meeting is presented in the audio mode and the visual mode in a first split-screen region in the online meeting client, and the meeting content of the second online meeting is presented in the visual mode in a second split-screen region.

Figure 6:
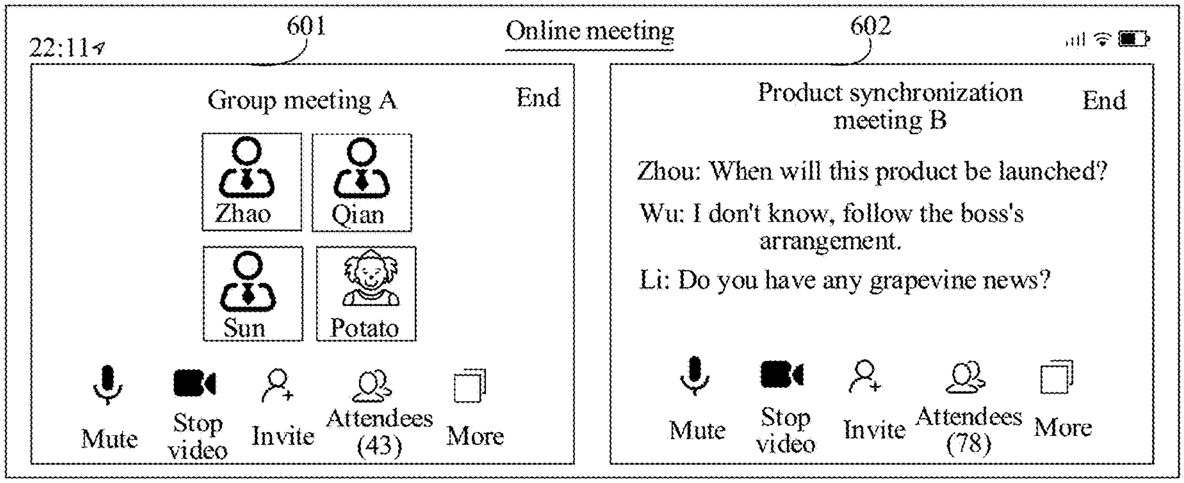
FIG. 6 is a schematic diagram of a data processing method of online meetings according to an embodiment of this application.

For example, FIG. 6 is a schematic diagram of a method for presenting meeting content of online meetings. An online meeting client includes a first split-screen region 601 and a second split-screen region 602. The first online meeting is a "group meeting A", and a second online meeting is a "product synchronization meeting B". In the first split-screen region 601, an audio mode is an audio form, and a visual mode is videos of meeting attendees. A visual mode in the second split-screen region 602 is a text form. Meeting content of the "group meeting A" is presented in the first split-screen region 601 in the audio form and the video form, and at the same time, meeting content of the "product synchronization meeting B" is presented in the second split-screen region 602 in the text form. That is, a meeting attendee of the online meetings can hear and see the meeting content of the "group meeting A" in the first split-screen region 601, and at the same time, can view the meeting content of the "product synchronization meeting B" in the second split-screen region 602.

Step 406: Present the meeting content of the first online meeting in a meeting interface based on the presentation mode corresponding to the first online meeting; and present the meeting content of the second online meeting in the meeting interface based on the presentation mode corresponding to the second online meeting in a case that the second online meeting meets a preset condition.

In some embodiments, the preset condition includes any one of the following:

the meeting content of the second online meeting including the content of interest to the user account; and the meeting content of the second online meeting mentioning the meeting attendee corresponding to the user account.

For example, the meeting content of the first online meeting is presented in a meeting interface based on the presentation mode corresponding to the first online meeting; and the meeting content of the second online meeting is additionally presented in the meeting interface based on the visual mode in a case that the second online meeting meets the preset condition.

Figure 7:
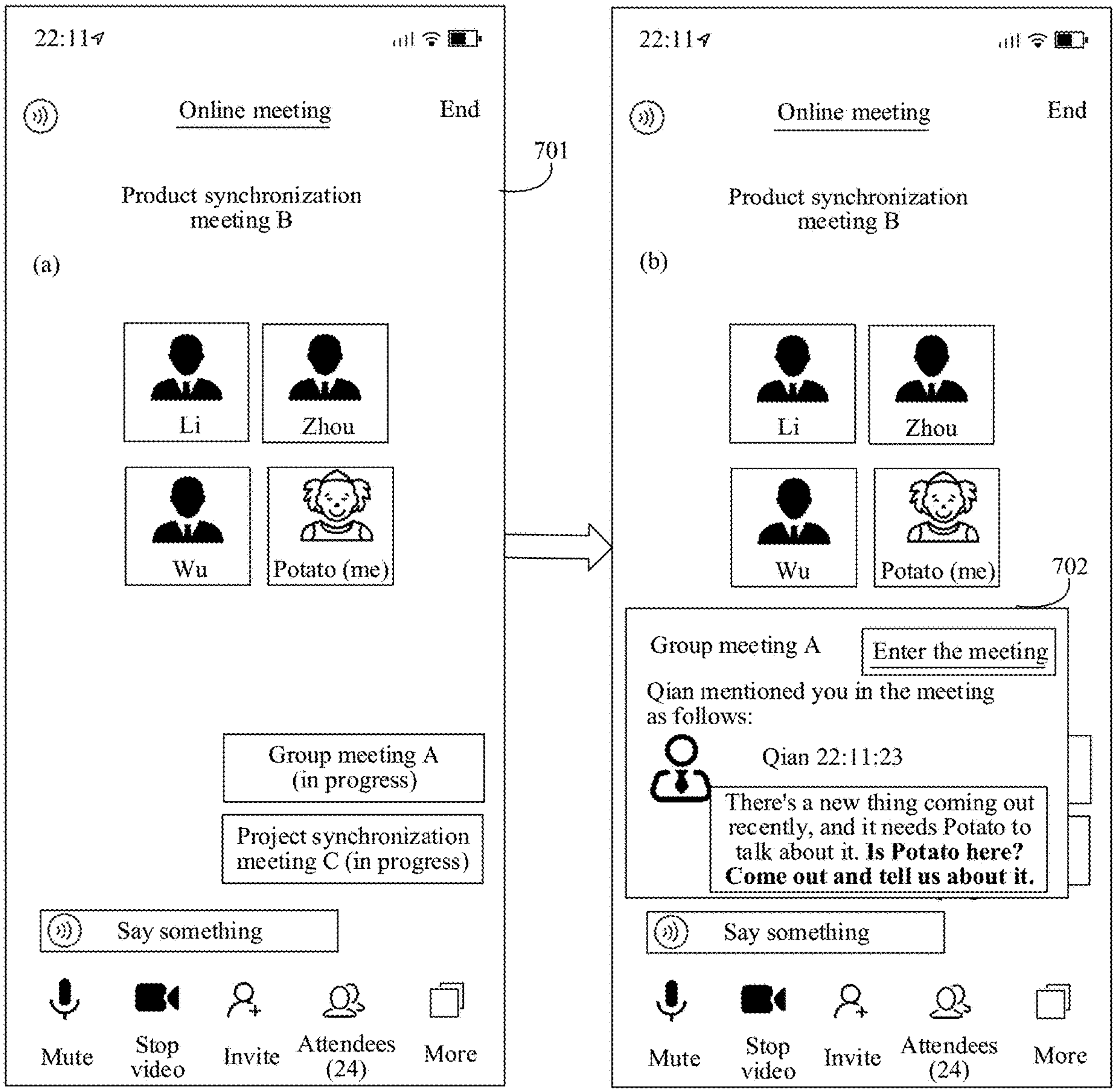
FIG. 7 is a schematic diagram of a data processing method of online meetings according to an embodiment of this application.

For example, FIG. 7 is a schematic diagram of a method for presenting meeting content of online meetings. The first online meeting is a "product synchronization meeting B", and a second online meeting is a "group meeting A". As shown in (a) of FIG. 7, the first online meeting is the "product synchronization meeting B", and meeting content of the "product synchronization meeting B" is presented in an audio form and a video form in a meeting interface 701 of an online meeting client. When meeting content of the "group meeting A" mentions a meeting attendee "Potato" corresponding to a user account, as shown in (b) of FIG. 7, a bubble panel 702 pops up in the meeting interface 701, and content related to the meeting attendee "Potato" corresponding to the user account is presented and highlighted in the meeting content of the "group meeting A" presented in the bubble panel 702. In addition, an "enter meeting" identifier is also displayed on the bubble panel 702. The meeting content of the "group meeting A" is displayed in the meeting interface 701 of the online meeting client by triggering the "enter meeting" identifier. That is, the meeting attendee "Potato" corresponding to the user account enters the "group meeting A" by triggering the "enter meeting" identifier.

Figure 8:
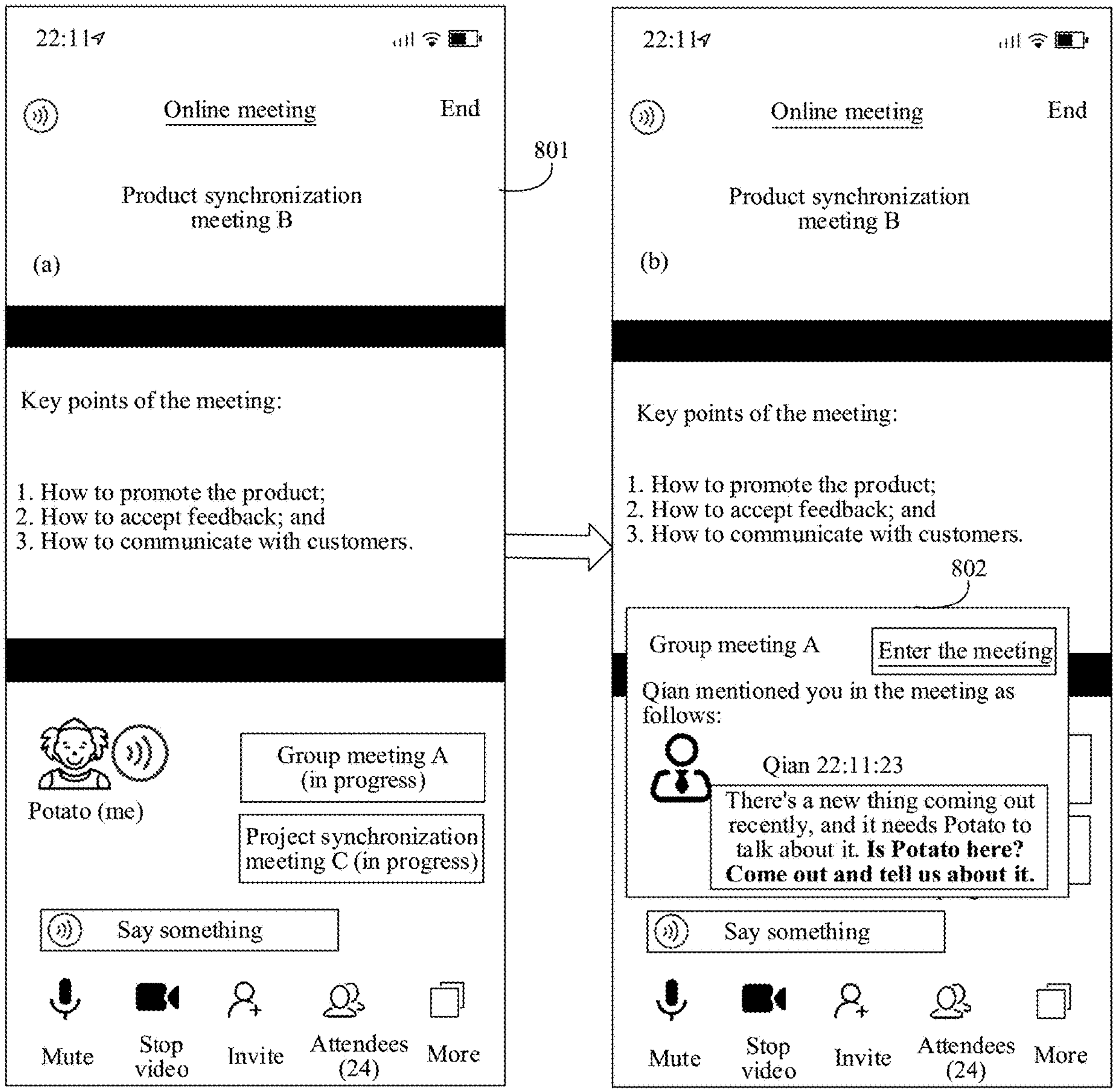
FIG. 8 is a schematic diagram of a data processing method of online meetings according to an embodiment of this application.

For example, FIG. 8 is a schematic diagram of a method for presenting meeting content of online meetings. A first online meeting is a "product synchronization meeting B", and a second online meeting is a "group meeting A". As shown in (a) of FIG. 8, the first online meeting is the "product synchronization meeting B", and meeting content of the "product synchronization meeting B" is presented in an audio form and a video form in a meeting interface 801 of an online meeting client. For example, the "product synchronization meeting B" presents PPT content in the meeting interface 801 of the online meeting client, while a meeting attendee "Potato" explains the PPT content. When meeting content of the "group meeting A" mentions the meeting attendee "Potato" corresponding to a user account, as shown in (b) of FIG. 8, a bubble panel 802 pops up in the meeting interface 801, and content related to the meeting attendee "Potato" corresponding to the user account is presented and highlighted in the meeting content of the "group meeting A" presented in the bubble panel 802. In addition, an "enter meeting" identifier is also displayed on the bubble panel 802. The meeting content of the "group meeting A" is displayed in the meeting interface 801 of the online meeting client by triggering the "enter meeting" identifier. That is, the meeting attendee "Potato" corresponding to the user account enters the "group meeting A" by triggering the "enter meeting" identifier.

For example, the meeting content of the first online meeting is presented in a meeting interface based on the presentation mode corresponding to the first online meeting; and the meeting content of the second online meeting is presented in the meeting interface based on the visual mode and the audio mode in a case that the second online meeting meets the preset condition.

Figure 9:
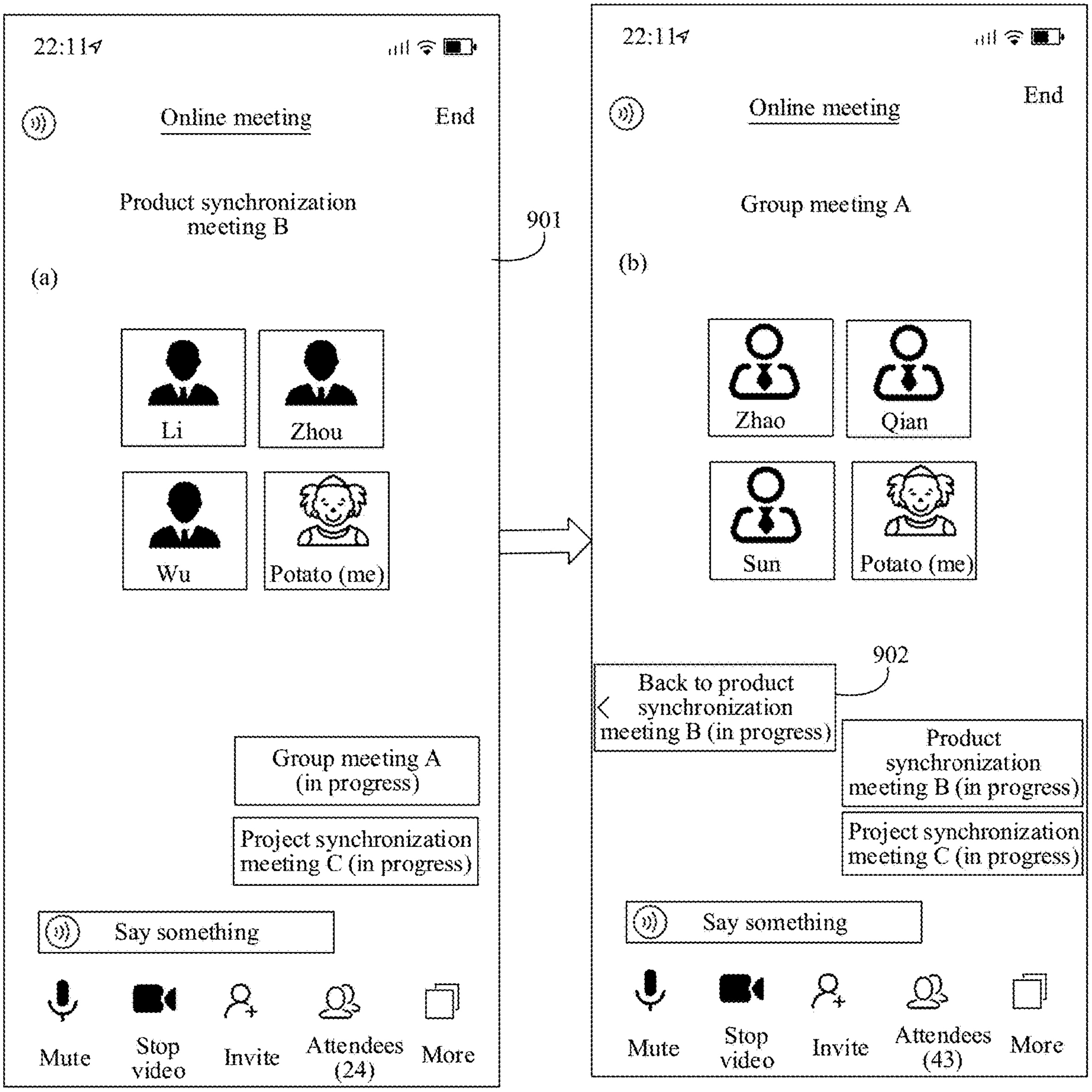
FIG. 9 is a schematic diagram of a data processing method of online meetings according to an embodiment of this application.

For example, FIG. 9 is a schematic diagram of a method for presenting meeting content of online meetings. The first online meeting is a "product synchronization meeting B", and a second online meeting is a "group meeting A". As shown in (a) of FIG. 9, the first online meeting is the "product synchronization meeting B", and meeting content of the "product synchronization meeting B" is presented in an audio form and a video form in a meeting interface 901 of an online meeting client. When meeting content of the "group meeting A" mentions a meeting attendee "Potato" corresponding to a user account, as shown in (b) of FIG. 9, the meeting content of the "group meeting A" is presented in an audio form in the meeting interface 901, that is, only the meeting content of the "group meeting A" is presented in the meeting interface 901. In addition, a quick switch entry 902 for quickly returning to the previous online meeting is displayed in the meeting interface 901. The meeting content of the "group meeting A" may be quickly switched to the meeting content of the "product synchronization meeting B" in the meeting interface 901 by triggering the quick switch entry 902. The names Li, Zhou, Wu, and Potato in the figures are exemplary names and are used only for exemplary examples in this embodiment. Similarly, other names in FIG. 6 to FIG. 11 in this application are also exemplary names.

Figure 10:
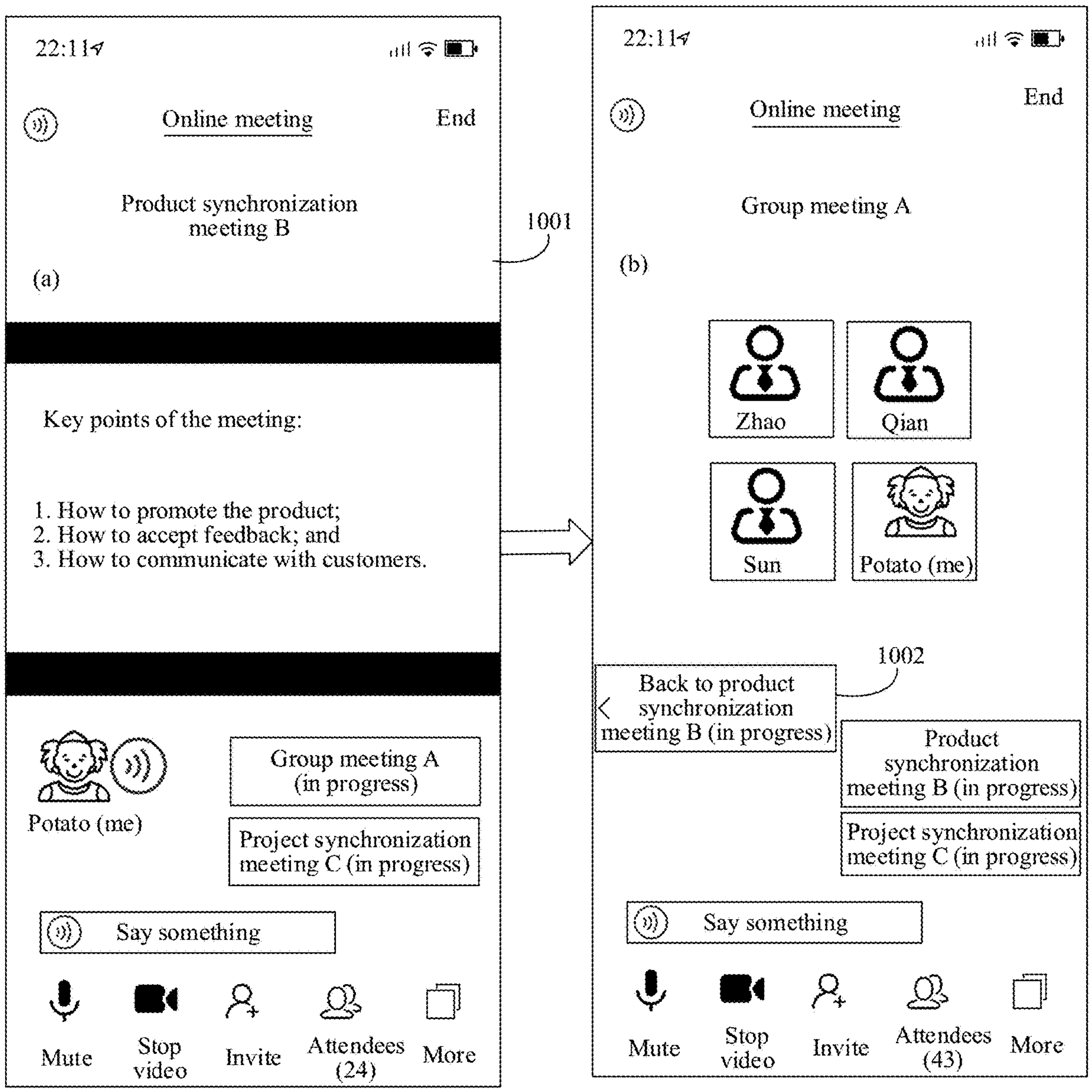
FIG. 10 is a schematic diagram of a data processing method of online meetings according to an embodiment of this application.

For example, FIG. 10 is a schematic diagram of a method for presenting meeting content of online meetings. The first online meeting is a "product synchronization meeting B", and a second online meeting is a "group meeting A". As shown in (a) of FIG. 10, the first online meeting is the "product synchronization meeting B", and meeting content of the "product synchronization meeting B" is presented in an audio form and a video form in a meeting interface 1001 of an online meeting client. For example, the "product synchronization meeting B" presents PPT content in the meeting interface 1001 of the online meeting client, while a meeting attendee "Potato" explains the PPT content. When meeting content of the "group meeting A" mentions the meeting attendee "Potato" corresponding to a user account, as shown in (b) of FIG. 10, the meeting content of the "group meeting A" is presented in an audio form in the meeting interface 1001, that is, only the meeting content of the "group meeting A" is presented in the meeting interface 1001. In addition, a quick switch entry 1002 for quickly returning to the previous online meeting is displayed in the meeting interface 1001. The meeting content of the "group meeting A" may be quickly switched to the meeting content of the “product synchronization meeting B” in the meeting interface 1001 by triggering the quick switch entry 1002.

In one embodiment, in response to a selection operation on any one of the at least two online meetings, the meeting content of the online meeting is displayed in the online meeting client.

In one embodiment, in each of the at least two online meetings, a meeting identifier of the other online meeting is displayed; and the online meeting corresponding to the meeting identifier is displayed through switching in response to a selection operation on the meeting identifier.

Figure 11:
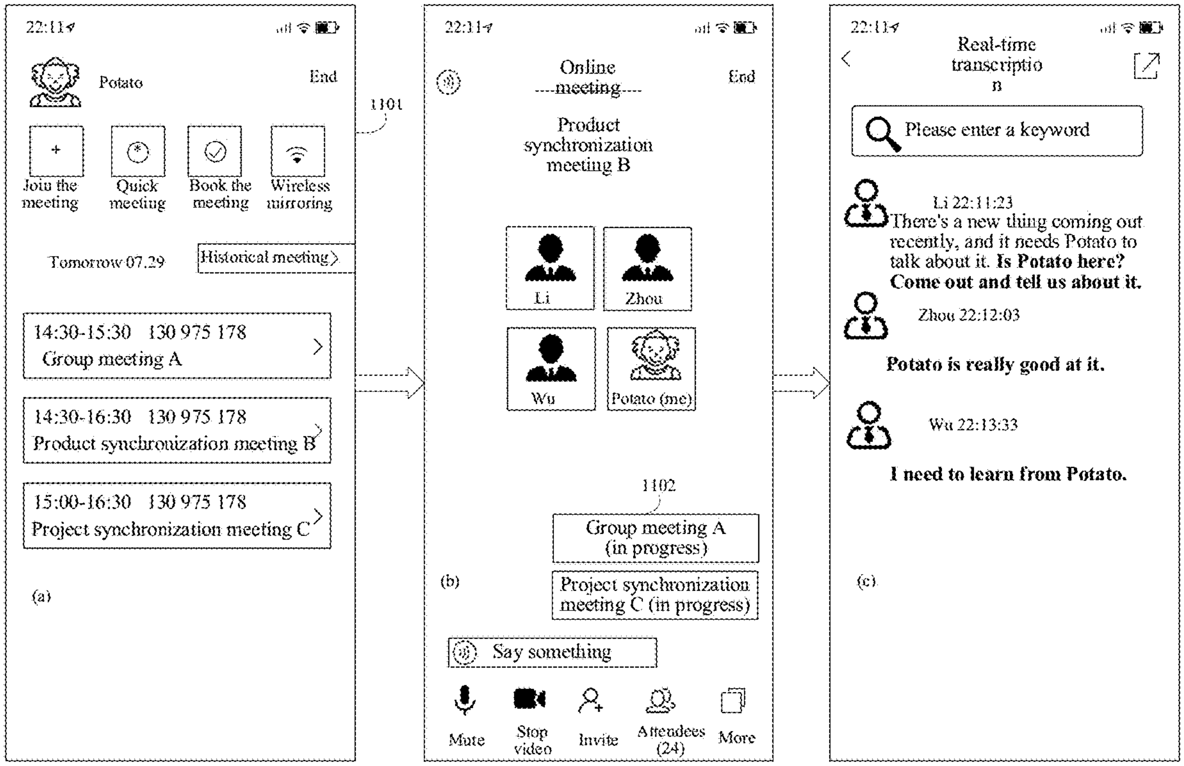
FIG. 11 is a schematic diagram of a data processing method of online meetings according to an embodiment of this application.

For example, FIG. 11 is a schematic diagram of a method for presenting meeting content of online meetings. As shown in (a) of FIG. 11, a list of online meetings to be joined is displayed on an interface 1101 of an online meeting client. The list of online meetings includes meeting names and meeting times of the online meetings, and meeting numbers corresponding to the online meetings. For example, the online meetings in the list of online meetings include a “group meeting A”, a “product synchronization meeting B”, and a “project synchronization meeting C”. As shown in (b) of FIG. 11, meeting content of the “product synchronization meeting B” is presented in an audio form and a video form in a meeting interface of the online meeting client by triggering the “product synchronization meeting B” in the list of online meetings. The meeting interface of the “product synchronization meeting B” may be returned to the list of online meetings to rejoin another online meeting. After a meeting attendee corresponding to a user account joins the “product synchronization meeting B”, the “group meeting A”, and the “project synchronization meeting C” in sequence, meeting identifiers 1102 corresponding to the “group meeting A” and the “project synchronization meeting C” are displayed in the meeting interface of the “product synchronization meeting B”. The online meeting corresponding to the meeting identifier 1102 is displayed through switching by triggering the corresponding meeting identifier 1102. In addition, when the “group meeting A”, the “product synchronization meeting B”, and the “project synchronization meeting C” are joined at the same time, and the meeting content of the “product synchronization meeting B” is presented in the audio form and the video form in the meeting interface of the online meeting client, a computer device automatically performs speech-to-text transcription for the “group meeting A” and the “project synchronization meeting C” to convert speech of other meeting attendees in the “group meeting A” and the “project synchronization meeting C” into text. As shown in (c) of FIG. 11, the text includes a profile photo, a nickname, and a speaking time of a speaker, but is not limited thereto. This is not specifically limited in the embodiments of this application.

Based on the above, by the method provided in this embodiment, when at least two online meetings are joined using the same user account in an online meeting client, various cases of presenting meeting content of each online meeting in a presentation mode corresponding to each online meeting are listed. In this application, the at least two online meetings are joined using the same user account, and the meeting content of each online meeting is presented in the online meeting client based on the presentation mode corresponding to each online meeting. The problem that a meeting attendee cannot join a plurality of online meetings at the same time is resolved in various presentation modes based on the foregoing method, which increases the attendance efficiency and does not affect the progress of the online meetings.

Figure 12:
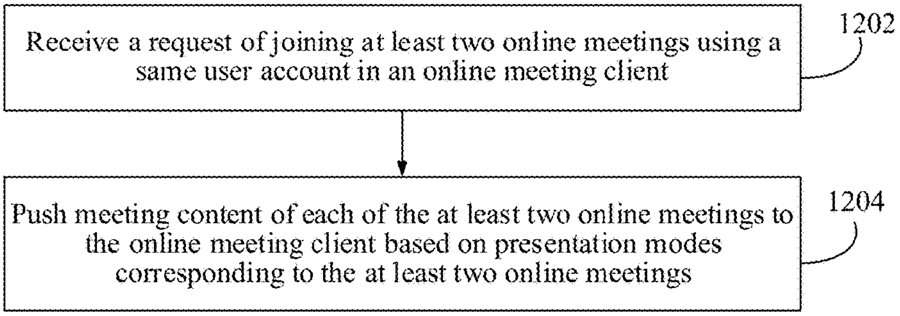
FIG. 12 is a flowchart of a data processing method of online meetings according to an embodiment of this application.

FIG. 12 is a flowchart of a data processing method of online meetings according to an embodiment of this application. The method may be performed by a computer device. The computer device may be the server 200 in FIG. 2. The method includes the following steps:

Step 1202: Receive a request of joining at least two online meetings using a same user account in an online meeting client.

For example, the online meeting is a network meeting joined by a meeting attendee at any location by logging in to the online meeting client using an account.

In some embodiments, the online meeting client is any one of a program client and a web client, but is not limited thereto. This is not specifically limited in the embodiments of this application.

In some embodiments, the same user account is one account, or at least two associated accounts with an association relationship are considered as one account, but is not limited thereto. This is not specifically limited in the embodiments of this application.

In some embodiments, the at least two online meetings are at least two online meetings with the same meeting time or at least two online meetings with intersecting meeting time, but are not limited thereto. This is not specifically limited in the embodiments of this application.

For example, the server receives the request of joining the at least two online meetings using the same user account in the online meeting client. For example, the at least two online meetings include a “group meeting A”, a “product synchronization meeting B”, and a “project synchronization meeting C”, and the server receives the request of joining the “group meeting A” and the “product synchronization meeting B” at the same time using the same user account in the online meeting client.

Step 1204: Push meeting content of each of the at least two online meetings to the online meeting client based on presentation modes corresponding to the at least two online meetings.

The presentation mode includes at least one of a visual mode and an audio mode, and the presentation mode corresponding to at most one of the at least two online meetings includes the audio mode.

For example, the server pushes the meeting content of each of the at least two online meetings to the online meeting client based on the presentation modes corresponding to the at least two online meetings.

For example, the at least two online meetings include an online meeting A and an online meeting B. The server pushes meeting content of the online meeting A to the online meeting client based on a presentation mode corresponding to the online meeting A. The server pushes meeting content of the online meeting B to the online meeting client based on a presentation mode corresponding to the online meeting B.

In some embodiments, the presentation mode corresponding to the online meeting A and the presentation mode corresponding to the online meeting B may be the same or may be different. This is not specifically limited in the embodiments of this application.

Based on the above, by the method provided in this embodiment, a request of joining at least two online meetings using a same user account in an online meeting client is received; and meeting content of each of the at least two online meetings is pushed to the online meeting client based on presentation modes corresponding to the at least two online meetings. In this application, the at least two online meetings are joined using the same user account, and the meeting content of each online meeting is presented in the online meeting client based on the presentation mode corresponding to each online meeting. The problem that a meeting attendee cannot join a plurality of online meetings at the same time is resolved based on the foregoing method, which increases the attendance efficiency and does not affect the progress of the online meetings.

Figure 13:
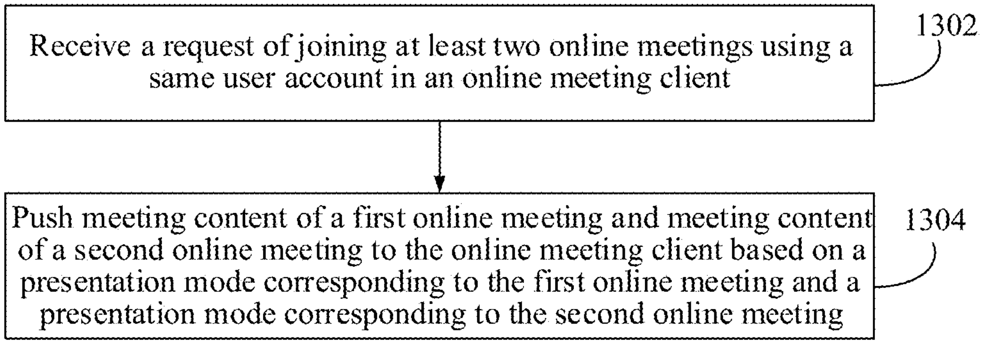
FIG. 13 is a flowchart of a data processing method of online meetings according to an embodiment of this application.

FIG. 13 is a flowchart of a data processing method of online meetings according to an embodiment of this application. The method may be performed by a computer device. The computer device may be the server 200 in FIG. 2. The method includes the following steps:

Step 1302: Receive a request of joining at least two online meetings using a same user account in an online meeting client.

For example, the server receives the request of joining the at least two online meetings using the same user account in the online meeting client; and pushes the meeting content of each of the at least two online meetings to the online meeting client based on the presentation modes corresponding to the at least two online meetings.

In some embodiments, the presentation mode corresponding to at most one of the at least two online meetings includes an audio mode.

In some embodiments, an online meeting corresponding to the audio mode in the at least two online meetings includes any one or more of the following:

the first joined online meeting, the first online meeting of the at least two online meetings that is joined using the same user account;

the last joined online meeting, the last online meeting of the at least two online meetings that is joined using the same user account;

an online meeting designated or selected by a human-computer interaction operation, for example, an online meeting B, in the at least two online meetings joined using the same user account, designated to present meeting content in the audio mode;

an online meeting only in which there is a speaker at the same time, for example, an online meeting, in the at least two online meetings joined using the same user account, only in which there is a speaker at the same time, and presenting meeting content in the audio mode, where meeting content of a first online meeting and meeting content of a second online meeting are presented in a split-screen form, and the presentation of the meeting content of the online meeting only in which there is a speaker at the same time in the audio mode can highlight the online meeting in which there is currently a speaker;

an online meeting whose current meeting content includes content of interest to the user account, where the current meeting, in the at least two online meetings joined using the same user account, presents the meeting content in the audio mode when the current meeting content includes the content of interest to the user account; and an online meeting whose current meeting content mentions a meeting attendee corresponding to the user account, where the current meeting, in the at least two online meetings joined using the same user account, presents the meeting content in the audio mode when the current meeting content mentions the meeting attendee corresponding to the user account.

In some embodiments, the visual mode includes at least one of the following:

displaying meeting material, where the meeting material is meeting content presented by a meeting attendee at an online meeting, for example, at least one of PPT content, image content, and video content that are presented by the attendee, but is not limited thereto, and this is not specifically limited in the embodiments of this application;

displaying a video of a meeting attendee, where the video of the meeting attendee is a real-time meeting video of the meeting attendee;

displaying speech content text of a speaker in the online meeting, where the speech content text is obtained by a speech-to-text transcription technology; and displaying conversation content of the online meeting, where the conversation content is conversation content of meeting attendees in a chat box.

Step 1304: Push meeting content of the first online meeting and meeting content of the second online meeting to the online meeting client based on a presentation mode corresponding to the first online meeting and a presentation mode corresponding to the second online meeting.

For example, the server pushes the meeting content of the first online meeting to the online meeting client based on the visual mode corresponding to the first online meeting, and pushes the meeting content of the second online meeting to the online meeting client based on the visual mode corresponding to the second online meeting.

In some embodiments, the meeting content of the first online meeting is any one of native visual meeting content, visual meeting content generated based on conversion of audio meeting content, and audio meeting content for conversion to visual meeting content, but is not limited thereto. This is not specifically limited in the embodiments of this application.

The native visual meeting content is visual meeting content collected by the online meeting client corresponding to the first online meeting.

The visual meeting content generated based on conversion of audio meeting content is visual meeting content finally obtained by the server based on conversion of the audio meeting content collected by the online meeting client corresponding to the first online meeting.

Any one of the audio meeting content for conversion to visual meeting content means that the server sends the audio meeting content to the online meeting client and the online meeting client converts the audio meeting content into the visual meeting content.

In some embodiments, the meeting content of the second online meeting is any one of visual meeting content generated based on conversion of audio meeting content and audio meeting content for conversion to visual meeting content, but is not limited thereto. This is not specifically limited in the embodiments of this application.

The visual meeting content generated based on conversion of audio meeting content of the second online meeting is visual meeting content finally obtained by the server based on conversion of the audio meeting content collected by the online meeting client corresponding to the second online meeting.

Any one of the audio meeting content for conversion to visual meeting content of the second online meeting means that the server sends the audio meeting content to the online meeting client and the online meeting client converts the audio meeting content into the visual meeting content.

For example, the first online meeting is a "group meeting A", and the second online meeting is a "product synchronization meeting B". A visual mode is a text form. The server pushes meeting content of the "group meeting A" to the online meeting client in the text form, and at the same time, the server pushes meeting content of the "product synchronization meeting B" to the online meeting client in the text form. That is, a meeting attendee of the online meetings can view the meeting content of the two online meetings in the online meeting client at the same time.

For example, the server pushes the meeting content of the first online meeting to the online meeting client based on the visual mode and the audio mode corresponding to the first online meeting, and pushes the meeting content of the second online meeting to the online meeting client based on the visual mode corresponding to the second online meeting.

For example, the first online meeting is a "group meeting A", and the second online meeting is a "product synchronization meeting B". An audio mode corresponding to the "group meeting A" is an audio form, and a visual mode corresponding to the "group meeting A" is videos of meeting attendees. A visual mode corresponding to the "product synchronization meeting B" is a text form. The server pushes meeting content of the "group meeting A" to the online meeting client in the visual mode and the audio mode corresponding to the "group meeting A", and at the same time, the server pushes meeting content of the "product synchronization meeting B" to the online meeting client in the text form corresponding to the "product synchronization meeting B".

In one embodiment, the server pushes the meeting content of the first online meeting to the online meeting client based on the presentation mode corresponding to the first online meeting; and pushes the meeting content of the second online meeting to the online meeting client based on the presentation mode corresponding to the second online meeting in a case that the second online meeting meets a preset condition.

In some embodiments, the preset condition includes any one of the following:

- the meeting content of the second online meeting including the content of interest to the user account; and
- the meeting content of the second online meeting mentioning the meeting attendee corresponding to the user account.

For example, the server pushes the meeting content of the first online meeting to the online meeting client based on the presentation mode corresponding to the first online meeting; and pushes the meeting content of the second online meeting to the online meeting client based on the visual mode corresponding to the second online meeting in a case that the second online meeting meets a preset condition.

For example, the first online meeting is a "product synchronization meeting B", and the second online meeting is a "group meeting A". The server pushes meeting content of the "product synchronization meeting B" to the online meeting client in an audio form and a video form corresponding to the "product synchronization meeting B". When meeting content of the "group meeting A" mentions a meeting attendee "Potato" corresponding to a user account, the server pushes the meeting content of the "group meeting A" to the online meeting client in a visual mode corresponding to the "group meeting A".

For example, the server pushes the meeting content of the first online meeting to the online meeting client based on the presentation mode corresponding to the first online meeting; and pushes the meeting content of the second online meeting to the online meeting client based on the visual mode and the audio mode corresponding to the second online meeting in a case that the second online meeting meets a preset condition.

For example, the first online meeting is a "product synchronization meeting B", and the second online meeting is a "group meeting A". The server pushes meeting content of the "product synchronization meeting B" to the online meeting client in an audio form and a video form corresponding to the "product synchronization meeting B". When meeting content of the "group meeting A" mentions a meeting attendee "Potato" corresponding to a user account, the server pushes the meeting content of the "group meeting A" to the online meeting client in a visual mode and an audio mode corresponding to the "group meeting A".

Based on the above, by the method provided in this embodiment, a request of joining at least two online meetings using a same user account in an online meeting client is received; and meeting content of each of the at least two online meetings is pushed to the online meeting client based on presentation modes corresponding to the at least two online meetings. In this application, the at least two online meetings are joined using the same user account, and the meeting content of each online meeting is presented in the online meeting client based on the presentation mode corresponding to each online meeting. The problem that a meeting attendee cannot join a plurality of online meetings at the same time is resolved based on the foregoing method, which increases the attendance efficiency and does not affect the progress of the online meetings.

Figure 14:
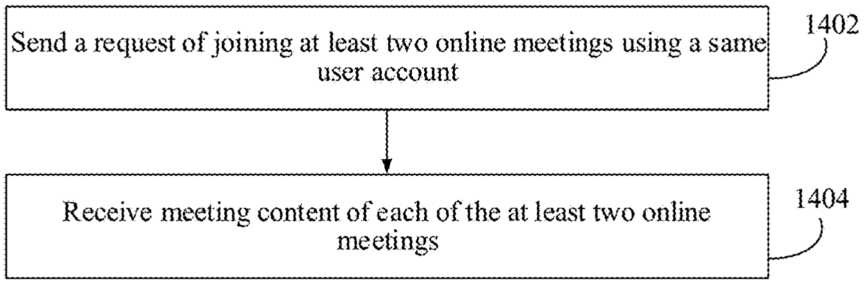
FIG. 14 is a flowchart of a data processing method of online meetings according to an embodiment of this application.

FIG. 14 is a flowchart of a data processing method of online meetings according to an embodiment of this application. The method may be performed by a computer device. The computer device may be terminal 100 in FIG. 2. An online meeting client is installed on the terminal 100. The method includes the following steps:

Step 1402: Send a request to join at least two online meetings using a same user account.

For example, an online meeting is a network meeting joined by a meeting attendee at any location by logging in to the online meeting client using an account.

In some embodiments, the online meeting client is any one of a program client and a web client, but is not limited thereto. This is not specifically limited in the embodiments of this application.

In some embodiments, the same user account is one account, or at least two associated accounts with an association relationship are considered as one account, but is not limited thereto. This is not specifically limited in the embodiments of this application.

In some embodiments, the at least two online meetings are at least two online meetings with the same meeting time or at least two online meetings with intersecting meeting time, but are not limited thereto. This is not specifically limited in the embodiments of this application.

For example, the online meeting client sends the request of joining the at least two online meetings using the same user account in the online meeting client. For example, the at least two online meetings include a "group meeting A", a "product synchronization meeting B", and a "project synchronization meeting C", and the online meeting client sends the request of joining the "group meeting A" and the "product synchronization meeting B" at the same time using the same user account in the online meeting client.

Step 1404: Receive meeting content of each of the at least two online meetings.

The presentation mode of the meeting content of the online meeting includes at least one of a visual mode and an audio mode, and the presentation mode corresponding to at most one of the at least two online meetings includes the audio mode.

For example, the online meeting client receives the meeting content of each of the at least two online meetings that is pushed by a server in the presentation modes corresponding to the at least two online meetings.

For example, at least two online meetings include an online meeting A and an online meeting B. The online meeting client receives meeting content of the online meeting A, and the online meeting client also receives meeting content of the online meeting B.

In some embodiments, the presentation mode corresponding to the online meeting A and the presentation mode corresponding to the online meeting B may be the same or may be different. This is not specifically limited in the embodiments of this application.

Based on the above, by the method provided in this embodiment, a request of joining at least two online meetings using a same user account is sent; and meeting content of each of the at least two online meetings is received. In this application, the meeting content of each of the at least two online meetings is received, and the meeting content of each online meeting is presented in the online meeting client based on the presentation mode corresponding to each online meeting. The problem that a meeting attendee cannot join a plurality of online meetings at the same time is resolved based on the foregoing method, which increases the attendance efficiency and does not affect the progress of the online meetings.

Figure 15:
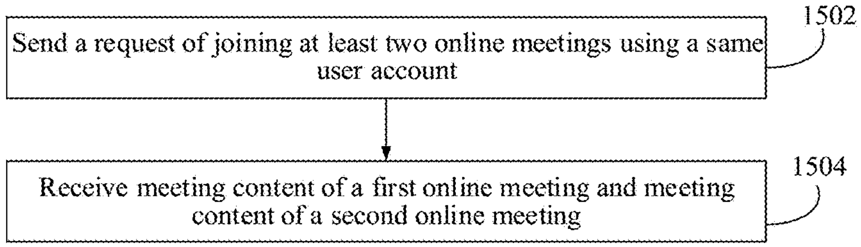
FIG. 15 is a flowchart of a data processing method of online meetings according to an embodiment of this application.

FIG. 15 is a flowchart of a data processing method of online meetings according to an embodiment of this application. The method may be performed by a computer device. The computer device may be terminal 100 in FIG. 2. An online meeting client is installed on terminal 100. The method includes the following steps:

Step 1502: Send a request of joining at least two online meetings using a same user account.

For example, the online meeting client sends, to a server, the request to join the at least two online meetings using the same user account.

In the online meeting client, the presentation mode corresponding to at most one of the at least two online meetings includes an audio mode.

In some embodiments, an online meeting corresponding to the audio mode in the at least two online meetings includes any one or more of the following:

- the first joined online meeting, the first online meeting of the at least two online meetings that is joined using the same user account;
- the last joined online meeting, the last online meeting of the at least two online meetings that is joined using the same user account;
- an online meeting designated or selected by a human-computer interaction operation, for example, an online meeting B, in the at least two online meetings joined using the same user account, designated to present meeting content in the audio mode;
- an online meeting only in which there is a speaker at the same time, for example, an online meeting, in the at least two online meetings joined using the same user account, only in which there is a speaker at the same time, and presenting meeting content in the audio mode, where meeting content of a first online meeting and meeting content of a second online meeting are presented in a split-screen form, and the presentation of the meeting content of the online meeting only in which there is a speaker at the same time in the audio mode can highlight the online meeting in which there is currently a speaker;
- an online meeting whose current meeting content includes content of interest to the user account, where the current meeting, in the at least two online meetings joined using the same user account, presents the meeting content in the audio mode when the current meeting content includes the content of interest to the user account; and
- an online meeting whose current meeting content mentions a meeting attendee corresponding to the user account, where the current meeting, in the at least two online meetings joined using the same user account, presents the meeting content in the audio mode when the current meeting content mentions the meeting attendee corresponding to the user account.

In some embodiments, the visual mode includes at least one of the following:

- displaying meeting material, where the meeting material is meeting content presented by a meeting attendee at an online meeting, for example, at least one of PPT content, image content, and video content that are presented by the attendee, but is not limited thereto, and this is not specifically limited in the embodiments of this application;
- displaying a video of a meeting attendee, where the video of the meeting attendee is a real-time meeting video of the meeting attendee;
- displaying speech content text of a speaker in the online meeting, where the speech content text is obtained by a speech-to-text transcription technology; and
- displaying conversation content of the online meeting, where the conversation content is conversation content of meeting attendees in a chat box.

Step 1504: Receive meeting content of a first online meeting and meeting content of a second online meeting.

For example, the online meeting client receives the meeting content of the first online meeting, and the online meeting client receives the meeting content of the second online meeting.

For example, the first online meeting is a “group meeting A”, and the second online meeting is a “product synchronization meeting B”. A visual mode is a text form. The online meeting client receives meeting content of the “group meeting A” pushed by the server to the online meeting client in the text form, and at the same time, the online meeting client receives meeting content of the “product synchronization meeting B” pushed by the server to the online meeting client in the text form. That is, a meeting attendee of the online meetings can view the meeting content of the two online meetings in the online meeting client at the same time.

For example, the online meeting client receives the meeting content of the first online meeting pushed by the server to the online meeting client in the visual mode and the audio mode corresponding to the first online meeting, and the online meeting client receives the meeting content of the second online meeting pushed to the online meeting client in the visual mode corresponding to the second online meeting.

For example, the first online meeting is a “group meeting A”, and the second online meeting is a “product synchronization meeting B”. An audio mode corresponding to the “group meeting A” is an audio form, and a visual mode corresponding to the “group meeting A” is videos of meeting attendees. A visual mode corresponding to the “product synchronization meeting B” is a text form. The online meeting client receives meeting content of the “group meeting A” pushed by the server to the online meeting client in the visual mode and the audio mode corresponding to the "group meeting A", and at the same time, the online meeting client receives meeting content of the "product synchronization meeting B" pushed by the server to the online meeting client in the text form corresponding to the "product synchronization meeting B".

In one embodiment, the online meeting client receives the meeting content of the first online meeting pushed by the server to the online meeting client in the presentation mode corresponding to the first online meeting; and the online meeting client receives the meeting content of the second online meeting pushed by the server to the online meeting client in the presentation mode corresponding to the second online meeting in a case that the second online meeting meets a preset condition.

In some embodiments, the preset condition includes any one of the following:

- the meeting content of the second online meeting including the content of interest to the user account; and
- the meeting content of the second online meeting mentioning the meeting attendee corresponding to the user account.

For example, the online meeting client receives the meeting content of the first online meeting pushed by the server to the online meeting client in the presentation mode corresponding to the first online meeting; and the online meeting client receives the meeting content of the second online meeting pushed to the online meeting client in the visual mode corresponding to the second online meeting in a case that the second online meeting meets a preset condition.

For example, the first online meeting is a "product synchronization meeting B", and the second online meeting is a "group meeting A". The online meeting client receives meeting content of the "product synchronization meeting B" pushed by the server to the online meeting client in an audio form and a video form corresponding to the "product synchronization meeting B". When meeting content of the "group meeting A" mentions a meeting attendee "Potato" corresponding to a user account, the online meeting client receives the meeting content of the "group meeting A" pushed by the server to the online meeting client in a visual mode corresponding to the "group meeting A".

For example, the online meeting client receives the meeting content of the first online meeting pushed by the server to the online meeting client in the presentation mode corresponding to the first online meeting; and the online meeting client receives the meeting content of the second online meeting pushed to the online meeting client in the visual mode and the audio mode corresponding to the second online meeting in a case that the second online meeting meets a preset condition.

For example, the first online meeting is a "product synchronization meeting B", and the second online meeting is a "group meeting A". The online meeting client receives meeting content of the "product synchronization meeting B" pushed by the server to the online meeting client in an audio form and a video form corresponding to the "product synchronization meeting B". When meeting content of the "group meeting A" mentions a meeting attendee "Potato" corresponding to a user account, the online meeting client receives the meeting content of the "group meeting A" pushed by the server to the online meeting client in a visual mode and an audio mode corresponding to the "group meeting A".

Based on the above, by the method provided in this embodiment, a request of joining at least two online meetings using the same user account is sent; and meeting content of each of the at least two online meetings is received. In this application, the meeting content of each of the at least two online meetings is received, and the meeting content of each online meeting is presented in the online meeting client based on the presentation mode corresponding to each online meeting. The problem that a meeting attendee cannot join a plurality of online meetings at the same time is resolved based on the foregoing method, which increases the attendance efficiency and does not affect the progress of the online meetings.

Figure 16:
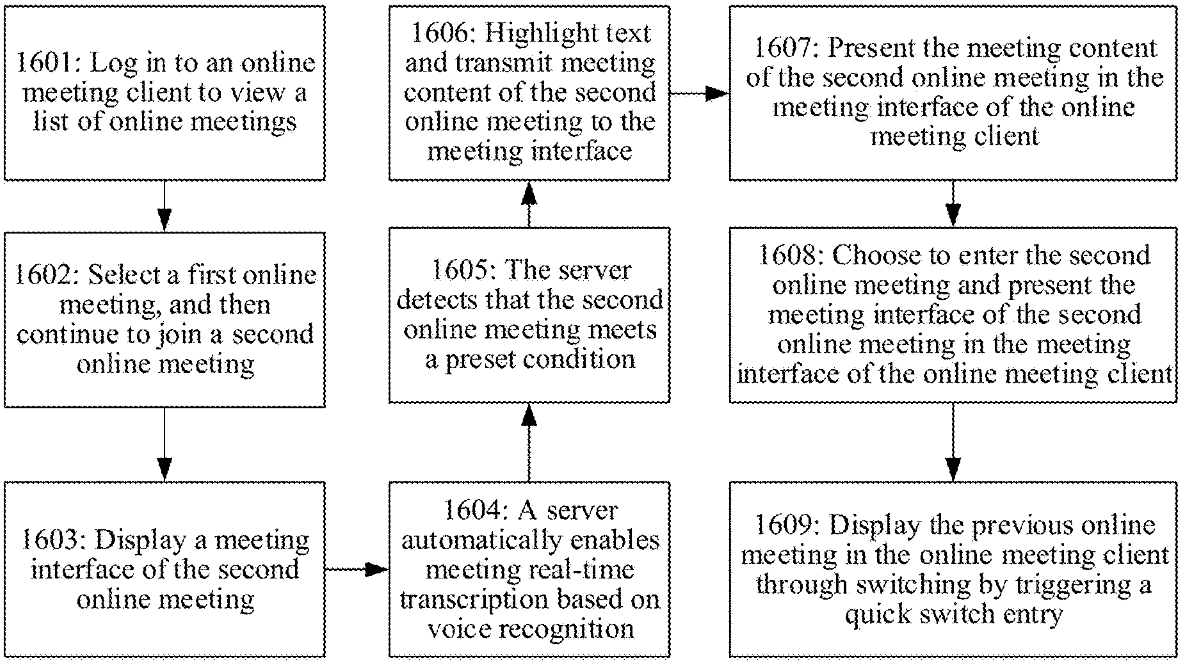
FIG. 16 is a flowchart of a data processing method of online meetings according to an embodiment of this application.

FIG. 16 is a flowchart of a data processing method of online meetings according to an embodiment of this application. The method may be performed by a computer device. The computer device may be terminal 100 and the server 200 in FIG. 2. An online meeting client is installed on terminal 100. The method includes the following steps:

Step 1601: Log in to an online meeting client to view a list of online meetings.

For example, an object logs in to the online meeting client using the same user account, and views the list of the online meetings in the online meeting client. For example, the online meetings in the list of the online meetings are a "group meeting A", a "product synchronization meeting B", and a "project synchronization meeting C".

Step 1602: Select a first online meeting, and then continue to join a second online meeting.

For example, the object may choose to join the first online meeting, and may continue to join the second online meeting while joining the first online meeting at the same time.

Step 1603: Display a meeting interface of the second online meeting.

For example, the meeting interface of the second online meeting is displayed after the object joins the second online meeting.

For example, the object may choose to join the "group meeting A", and the server records time when the object enters the "group meeting A" and information about the user account of the object, and displays the information about the user account. In a case that the object joins the "group meeting A", when the object chooses to join the "product synchronization meeting B", the server transmits attendance information of the object joining the "product synchronization meeting B" back to the online meeting client based on a distributed database (Tencent Distributed SQL, TDSQL), so that the online meeting client displays meeting content of the "product synchronization meeting B". When the object selects a finally displayed online meeting as a main meeting interface, the online meeting client sends a meeting room ID of the "product synchronization meeting B" to the server.

The distributed database TDSQL includes an SQL engine layer, a data storage layer, and a scheduler module. The SQL engine layer serves as an access point. Data is stored on each node in the distributed database, and each node may serve as a data unit. One master and two slaves or one master and a plurality of slaves may be deployed based on service requirements. One master and three slaves or even one master and four slaves may be deployed for service scenarios with higher requirements for data security. The scheduler module is configured to control the entire computer system.

Step 1604: The server automatically enables meeting real-time transcription based on voice recognition.

For example, the server automatically enables the function of multi-meeting real-time transcription based on voice recognition when detecting that the object joins a plurality of online meetings at the same time. The server transmits audio/video streams only to an interface of the online meeting client of the current meeting interface of the object.

For audio/video streams of the other online meetings, the online meeting client is only responsible for collecting and transmitting audio streams to the server for decoding and generating text, but does not directly present the audio streams to the object. The server side decodes the audio streams of the corresponding online meeting, and finally transmits the text generated through decoding to the online meeting client of the corresponding online meeting.

Figure 17:
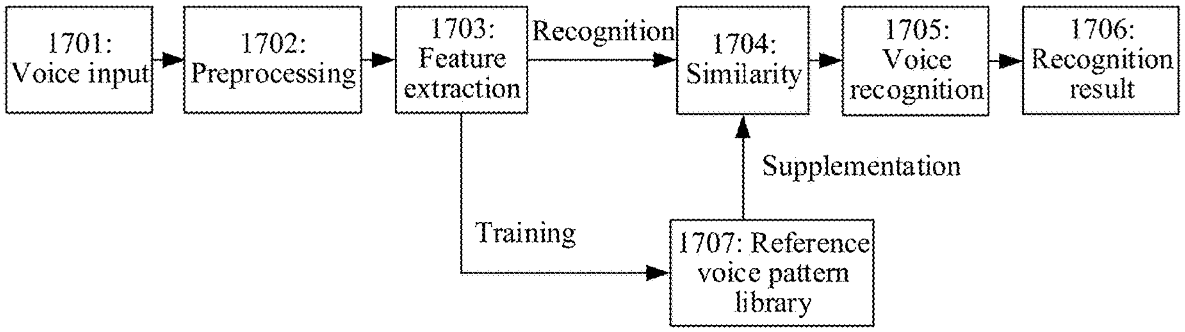
FIG. 17 is a schematic diagram of meeting real-time transcription of online meetings according to an embodiment of this application.
Figure 18:
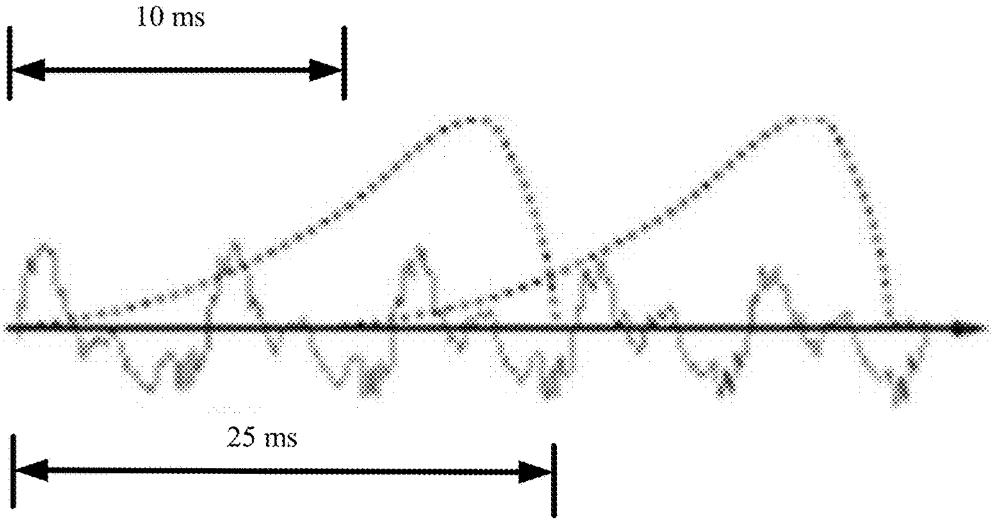
FIG. 18 is a schematic diagram of voice input according to an embodiment of this application.

For example, FIG. 17 is a schematic diagram of meeting real-time transcription of online meetings. The online meeting client corresponding to the second online meeting collects audio streams as voice input 1701 for transmission to the server, and the server performs preprocessing 1702 on the received voice input 1701. In some embodiments, the voice input 1701 is preprocessed by using a voice activity detection (VAD) technique before the voice input 1701 is recognized, to frame voice of a meeting speaker, cutting the voice into small segments. Each segment is referred to as a frame, and there is usually an overlap between frames (as shown in FIG. 18). The silence at the beginning and end is cut out to reduce the interference to the subsequent steps. In FIG. 18, a length of each frame is 25 milliseconds, and there is an overlap of (25−10=15) milliseconds between every two frames. The voice input 1701 is framed into many small segments. Based on physiological properties of human ears, each frame waveform is turned into a multidimensional vector for acoustic feature extraction 1703 to obtain a voice test signal.

The server detects in real time speech content of different speakers in the second online meeting. The server compares the voice test signal with a reference voice pattern library 1707 to obtain a similarity 1704 therebetween. The server performs voice recognition 1705 based on a dynamic time warping (DTW) algorithm to obtain a corresponding recognition result 1706.

Figure 19:
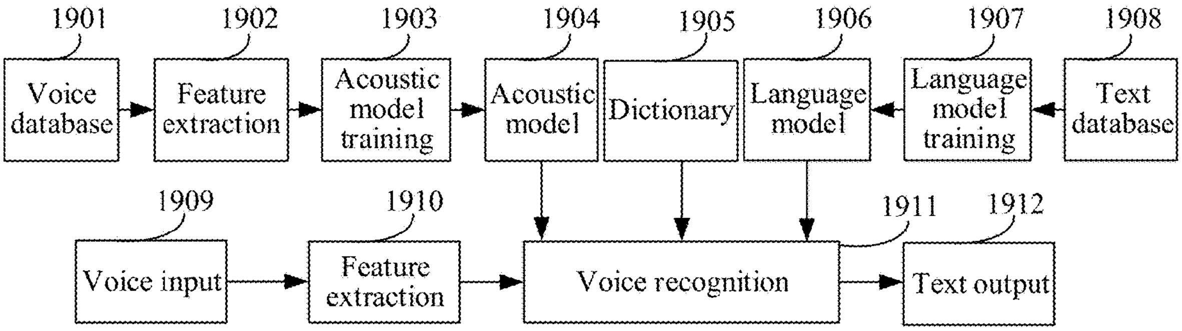
FIG. 19 is a schematic diagram of speech-to-text transcription of online meetings according to an embodiment of this application.

In some embodiments, FIG. 19 is a schematic diagram of speech-to-text transcription of online meetings. When the online meeting client corresponding to the second online meeting detects that there is a speaker speaking, the online meeting client collects and transmits audio/video data to the server. After receiving the audio data, the server decompresses and transcodes the audio as voice input 1909, and performs feature extraction 1910 to obtain a feature vector corresponding to the voice input 1909. The server performs similarity matching on the received audio data and a voice database 1901. When it is detected that the similarity between the audio data and the voice database 1901 reaches 95%, voice recognition 1911 is performed, by using an acoustic model 1904, a dictionary 1905, and a language model 1906, on the voice input 1909 with features extracted, to finally obtain text output 1912. The acoustic model 1904 is obtained by performing feature extraction 1902 on voice in the voice database 1901 and performing acoustic model training 1903 based on extracted acoustic features. The language model 1906 is obtained by performing feature extraction on text in a text database 1908 and performing language model training 1907 based on extracted text features.

Step 1605: The server detects that the second online meeting meets a preset condition.

For example, the server detects in real time whether the meeting content meets the preset condition when the server decodes the audio streams collected by the online meeting client corresponding to the second online meeting to generate text.

In some embodiments, the preset condition includes any one of the following:

the meeting content of the second online meeting including the content of interest to the user account; and the meeting content of the second online meeting mentioning the meeting attendee corresponding to the user account.

Step 1606: Highlight text and transmit the meeting content of the second online meeting to the meeting interface.

For example, when the meeting content of the second online meeting meets the preset condition, associated content in the meeting content of the second online meeting is highlighted, and the meeting content of the second online meeting is transmitted to the meeting interface of the first online meeting.

In some embodiments, the server transmits fields of the associated content back to the meeting interface corresponding to the first online meeting when detecting that the meeting content of the second online meeting mentions the meeting attendee corresponding to the user account. The online meeting client highlights keywords of the transmitted content and colors a sentence associated with the content. When the meeting content of the second online meeting does not mention the meeting attendee corresponding to the user account, the meeting interface of the first online meeting does not display the meeting content of the second online meeting.

When the meeting interface corresponding to the first online meeting displays the meeting content of the second online meeting, the meeting content of the second online meeting is displayed on the online meeting client in the form of a floating panel. The floating panel includes a time, nickname, and profile photo of a speaker, and context of speech content. In a case that the object chooses to stay in the current meeting interface, if there is no new meeting content mentioning the meeting attendee corresponding to the user account on the floating panel for more than 10 s, the floating panel is automatically or manually shrunk on the online meeting client.

Step 1607: Present the meeting content of the second online meeting in the meeting interface of the online meeting client.

Step 1608: Choose to enter the second online meeting and present the meeting interface of the second online meeting in the meeting interface of the online meeting client.

For example, the meeting interface of the second online meeting is presented in the meeting interface of the online meeting client by choosing to enter the second online meeting.

Step 1609: Display the previous online meeting in the online meeting client through switching by triggering a quick switch entry.

For example, the quick switch entry for quickly returning to the previous online meeting is displayed in the meeting interface of the second online meeting. The meeting content of the second online meeting may be quickly switched to the meeting content of the first online meeting in the meeting interface by triggering the quick switch entry.

Figure 20:
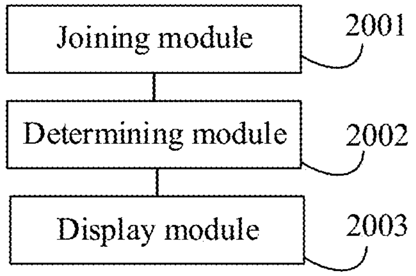
FIG. 20 is a block diagram of a data processing apparatus of online meetings according to an embodiment of this application.

FIG. 20 is a schematic diagram of a structure of a data processing apparatus of online meetings according to an embodiment of this application. The apparatus may be implemented as all or a part of a computer device by software, hardware, or a combination thereof. The apparatus includes:

a joining module 2001, configured to perform step 302 in the embodiment of FIG. 3;

a determining module 2002, configured to perform step 304 in the embodiment of FIG. 3; and a display module 2003, configured to perform step 306 in the embodiment of FIG. 3, the presentation mode including at least one of a visual mode and an audio mode, and the presentation mode corresponding to at most one of the at least two online meetings including the audio mode.

An online meeting corresponding to the audio mode in the at least two online meetings includes any one or more of the following:

the first joined online meeting; the last joined online meeting; an online meeting designated or selected by a human-computer interaction operation; an online meeting only in which there is a speaker at a same time; an online meeting whose current meeting content includes content of interest to the user account; and an online meeting whose current meeting content mentions a meeting attendee corresponding to the user account.

The visual mode includes at least one of the following:

displaying meeting material; displaying a video of a meeting attendee; displaying speech content text of a speaker in the online meeting, the speech content text being obtained by a speech-to-text transcription technology; and displaying conversation content of the online meeting.

The at least two online meetings include the first online meeting and the second online meeting.

In one embodiment, the display module 2003 is configured to perform step 404 in the embodiment of FIG. 4. In one embodiment, the display module 2003 is configured to present the meeting content of the first online meeting in the visual mode in a first split-screen region, and present the meeting content of the second online meeting in the visual mode in a second split-screen region; or present the meeting content of the first online meeting in the audio mode and the visual mode in a first split-screen region, and present the meeting content of the second online meeting in the visual mode in a second split-screen region.

In one embodiment, the display module 2003 is configured to perform step 406 in the embodiment of FIG. 4.

In one embodiment, the display module 2003 is configured to additionally present the meeting content of the second online meeting in the meeting interface based on the visual mode in a case that the second online meeting meets the preset condition.

In one embodiment, the display module 2003 is configured to present the meeting content of the second online meeting in the meeting interface based on the visual mode and the audio mode in a case that the second online meeting meets the preset condition.

The preset condition includes any one of the following:

the meeting content of the second online meeting including the content of interest to the user account; and the meeting content of the second online meeting mentioning the meeting attendee corresponding to the user account.

In one embodiment, the display module 2003 is configured to display, in response to a selection operation on any one of the at least two online meetings, the meeting content of the online meeting in the online meeting client.

In one embodiment, the display module 2003 is configured to display, in each of the at least two online meetings, a meeting identifier of the other online meeting; and switch to the online meeting corresponding to the meeting identifier in response to a selection operation on the meeting identifier.

Figure 21:
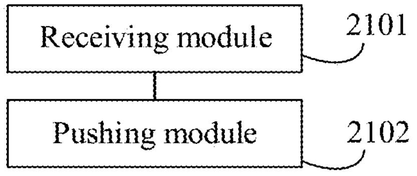
FIG. 21 is a block diagram of a data processing apparatus of online meetings according to an embodiment of this application.

FIG. 21 is a schematic diagram of a structure of a data processing apparatus of online meetings according to an embodiment of this application. The apparatus may be implemented as all or a part of a computer device by software, hardware, or a combination thereof. The apparatus includes:

a receiving module 2101, configured to perform step 1202 in the embodiment of FIG. 12; and a pushing module 2102, configured to perform step 1204 in the embodiment of FIG. 12, the presentation mode including at least one of a visual mode and an audio mode, and the presentation mode corresponding to at most one of the at least two online meetings including the audio mode.

An online meeting corresponding to the audio mode in the at least two online meetings includes any one or more of the following: the first joined online meeting; the last joined online meeting; an online meeting designated or selected by a human-computer interaction operation; an online meeting only in which there is a speaker at a same time; an online meeting whose current meeting content includes content of interest to the user account; and an online meeting whose current meeting content mentions a meeting attendee corresponding to the user account.

The visual mode includes at least one of the following:

displaying meeting material; displaying a video of a meeting attendee; displaying speech content text of a speaker in the online meeting, the speech content text being obtained by a speech-to-text transcription technology; and displaying conversation content of the online meeting.

The at least two online meetings include the first online meeting and the second online meeting.

In one embodiment, the pushing module 2102 is configured to perform step 1304 in the embodiment of FIG. 13. In one embodiment, the pushing module 2102 is configured to push the meeting content of the first online meeting to the online meeting client based on the visual mode corresponding to the first online meeting, and push the meeting content of the second online meeting to the online meeting client based on the visual mode corresponding to the second online meeting; or push the meeting content of the first online meeting to the online meeting client based on the visual mode and the audio mode corresponding to the first online meeting, and push the meeting content of the second online meeting to the online meeting client based on the visual mode corresponding to the second online meeting.

In one embodiment, the pushing module 2102 is configured to push the meeting content of the first online meeting to the online meeting client based on the presentation mode corresponding to the first online meeting; and push the meeting content of the second online meeting to the online meeting client based on the presentation mode corresponding to the second online meeting in a case that the second online meeting meets a preset condition.

In one embodiment, the pushing module 2102 is configured to push the meeting content of the second online meeting to the online meeting client based on the visual mode corresponding to the second online meeting in a case that the second online meeting meets the preset condition.

In one embodiment, the pushing module 2102 is configured to push the meeting content of the second online meeting to the online meeting client based on the visual mode and the audio mode corresponding to the second online meeting in a case that the second online meeting meets the preset condition.

The preset condition includes any one of the following:

the meeting content of the second online meeting including the content of interest to the user account; and the meeting content of the second online meeting mentioning the meeting attendee corresponding to the user account.

Figure 22:
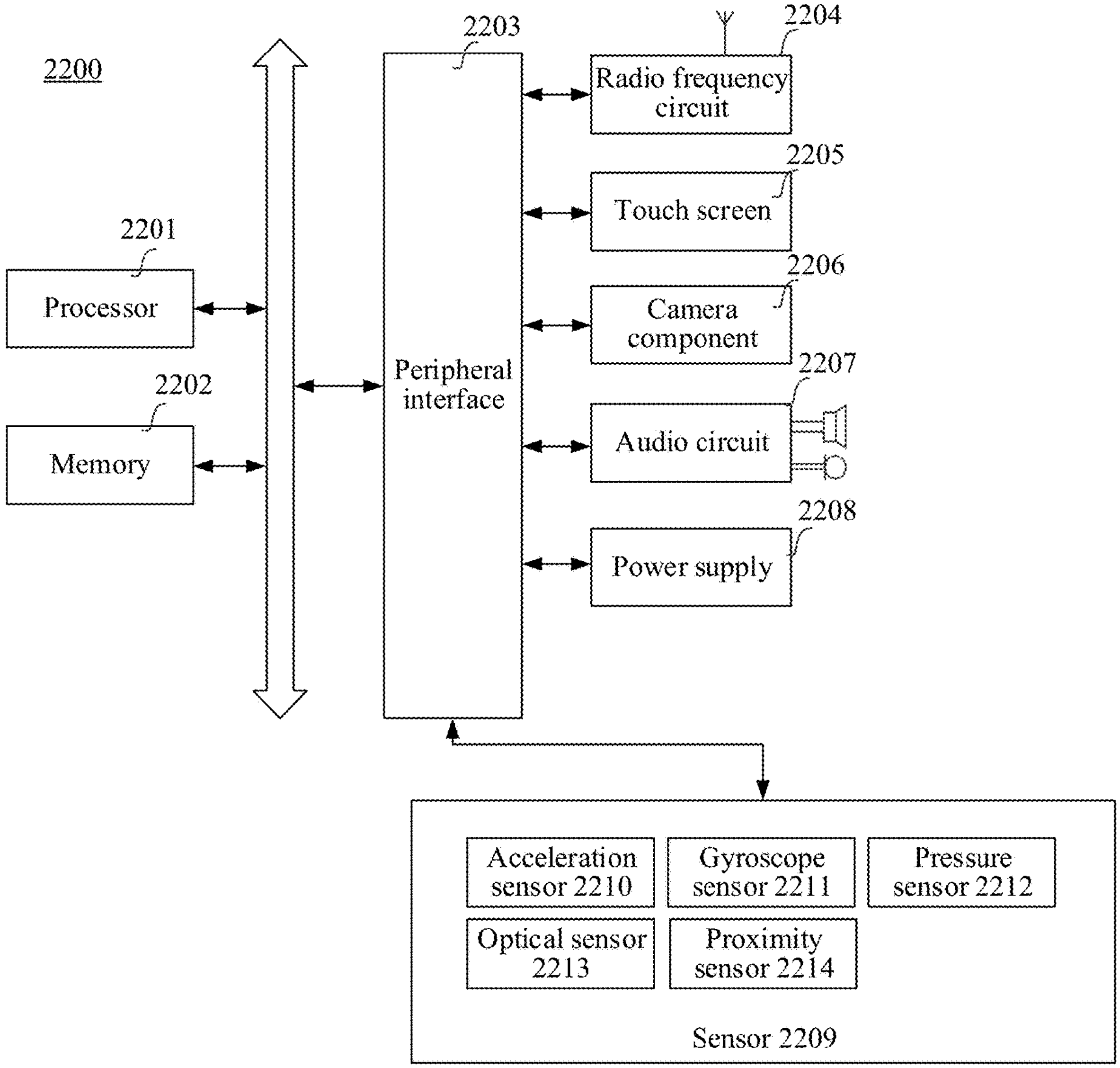
FIG. 22 is a schematic diagram of a structure of a computer device according to an embodiment of this application.

FIG. 22 is a block diagram of a computer device 2200 according to an embodiment of this application. The computer device 2200 may be a portable mobile terminal, such as a smartphone, a tablet computer, a moving picture experts group audio layer III (MP3) player, or a moving picture experts group audio layer IV (MP4) player. The computer device 2200 may also be referred to as another name such as user equipment or a portable terminal.

Usually, the computer device 2200 includes a processor 2201 and a memory 2202.

The processor 2201 may include one or more processing cores, for example, a 4-core processor or an 8-core processor. The processor 2201 may be implemented in at least one hardware form of digital signal processing (DSP), a field-programmable gate array (FPGA), and a programmable logic array (PLA). The processor 2201 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 2201 may be integrated with a graphics processing unit (GPU). The GPU is configured to render and draw content that needs to be displayed on a display screen. In some embodiments, the processor 2201 may further include an artificial intelligence (AI) processor. The AI processor is configured to process computing operations related to machine learning.

Memory 2202 may include one or more computer-readable storage media. The computer-readable storage medium may be tangible and non-transitory. The memory 2202 may further include a high-speed random access memory and a nonvolatile memory, for example, one or more disk storage devices or flash storage devices. In some embodiments, the non-transitory computer-readable storage medium in the memory 2202 is configured to store at least one instruction, and the at least one instruction is executed by the processor 2201 to implement the data processing method of online meetings provided in the embodiments of this application.

In some embodiments, the computer device 2200 may alternatively include: a peripheral interface 2203 and at least one peripheral. Specifically, the peripheral includes: at least one of a radio frequency (RF) circuit 2204, a touchscreen 2205, a camera component 2206, an audio circuit 2207, and a power supply 2208.

The peripheral interface 2203 may be configured to connect the at least one peripheral related to input/output (I/O) to the processor 2201 and the memory 2202. The RF circuit 2204 is configured to receive and transmit an RF signal, also referred to as an electromagnetic signal. The RF circuit 2204 communicates with a communication network and other communication devices through the electromagnetic signal. The RF circuit 2204 may further include a circuit related to near field communication (NFC). The touchscreen 2205 is configured to display a user interface (UI). The UI may include a graph, text, an icon, a video, and any combination thereof. The camera component 2206 is configured to capture images or videos. In some embodiments, the camera component 2206 includes a front-facing camera and a rear-facing camera. The audio circuit 2207 is configured to provide an audio interface between a user and the computer device 2200. The audio circuit 2207 may include a microphone and a loudspeaker. The microphone is configured to acquire sound waves of a user and an environment, and convert the sound waves into an electrical signal to input the electrical signal to the processor 2201 for processing, or input the electrical signal to the RF circuit 2204 for implementing voice communication. The power supply 2208 is configured to supply power to components in the computer device 2200. The power supply 2208 may be an alternating current, a direct current, a primary battery, or a rechargeable battery.

In some embodiments, the computer device 2200 further includes one or more sensors 2209. The one or more sensors 2209 include, but are not limited to: an acceleration sensor 2210, a gyroscope sensor 2211, a pressure sensor 2212, an optical sensor 2213, and a proximity sensor 2214. The acceleration sensor 2210 may detect a magnitude of acceleration on three coordinate axes of a coordinate system established with the computer device 2200. The gyroscope sensor 2211 may detect a body direction and a rotation angle of the computer device 2200. The gyroscope sensor 2211 may cooperate with the acceleration sensor 2210 to acquire a 3D action by a user on the computer device 2200. The pressure sensor 2212 may be disposed at a side frame of the computer device 2200 and/or a lower layer of the touchscreen 2205, to detect a holding signal by a user on the computer device 2200. The optical sensor 2213 is configured to acquire ambient light intensity. The proximity sensor 2214, also referred to as a distance sensor, is usually disposed on a front surface of the computer device 2200. The proximity sensor 2214 is configured to acquire a distance between a user and the front surface of the computer device 2200.

A person skilled in the art may understand that the structure shown in FIG. 22 constitutes no limitation on the computer device 2200, and the computer device may include more or fewer components than those shown in the figure, or some components may be combined, or a different component deployment may be used.

An embodiment of this application further provides a computer device. The computer device includes a processor and a memory. The memory stores at least one program, and the at least one program is loaded and executed by the processor, to implement the data processing method of online meetings according to the foregoing method embodiments.

An embodiment of this application further provides a computer-readable storage medium. The storage medium stores at least one computer program, and at least one computer program is loaded and executed by a processor, to implement the data processing method of online meetings according to the foregoing method embodiments.

An embodiment of this application further provides a computer program product. The computer program product includes a computer program. The computer program is stored in a computer-readable storage medium. The computer program is read and executed by a processor of a computer device from the computer-readable storage medium, to enable the computer device to perform the data processing method of online meetings according to the foregoing method embodiments.

It may be understood that data related to user data processing associated with user identities or characteristics, such as data, historical data, and portraits, that is involved in specific implementations of this application needs permission or consent of users when the foregoing embodiments of this application are applied to specific products or technologies, and collection, use, and processing of relevant data need to comply with relevant laws, regulations, and standards of relevant countries and regions.

What is claimed is:

1. A data processing method of online meetings, the method being performed by a computer device, and the method comprising:

joining at least two online meetings using a same user account in an online meeting client, wherein the at least two online meetings comprise a first online meeting and a second online meeting;

determining a presentation mode corresponding to each of the at least two online meetings, the presentation mode comprising at least one of a visual mode and an audio mode; and presenting meeting content of each online meeting, and no more than one of the at least two online meetings presenting in the audio mode, comprising:

presenting a first meeting content of the first online meeting in full screen in a meeting interface based on the presentation mode corresponding to the first online meeting;

in response to the second online meeting, which the same user account participates in simultaneously with the first online meeting, satisfying a preset condition, updating the meeting interface that presents the first meeting content of the first online meeting by overlaying, on top of a part of the first meeting content in the meeting interface, a second meeting content of the second online meeting as a notification, wherein the meeting interface further comprises a meeting identifier of the second online meeting; and in response to a selection operation on the meeting identifier while overlaying the second meeting content as the notification, switching to the second online meeting by presenting the second online meeting in full screen in the meeting interface.

2. The method according to claim 1, wherein an online meeting corresponding to the audio mode in the at least two online meetings comprises one or more of the following:

the first joined online meeting;

the last joined online meeting;

an online meeting designated or selected by a human-computer interaction operation;

an online meeting in which there is a speaker, the online meeting being the only meeting with a speaker at one instance;

an online meeting with current meeting content comprising content of interest to the user account; and an online meeting with current meeting content mentioning a meeting attendee corresponding to the user account.

3. The method according to claim 1, wherein the visual mode comprises at least one of:

displaying meeting material;

displaying a video of a meeting attendee;

displaying speech content text of a speaker in the online meeting, the speech content text being obtained by a speech-to-text transcription technology; or displaying conversation content of the online meeting.

4. The method according to claim 1, further comprising: presenting the meeting content of the second online meeting in the meeting interface based on the visual mode and the audio mode in response to that the second online meeting meets the preset condition.

5. The method according to claim 1, wherein the preset condition comprises at least one of:

a current meeting content of the second online meeting comprising content of interest to the user account; and the current meeting content of the second online meeting mentioning a meeting attendee corresponding to the user account.

6. The method according to claim 1, further comprising: displaying, in response to a selection operation on any one of the at least two online meetings, the meeting content of the online meeting in the online meeting client.

7. The method according to claim 1, further comprising:

displaying, in the second online meeting, a first meeting identifier of the first online meeting; and switching to the first online meeting corresponding to the first meeting identifier in response to a selection operation on the first meeting identifier.

8. A data processing apparatus of online meetings, comprising at least one processor and at least one memory, the at least one memory storing computer instructions, the at least one processor being configured to execute the computer instructions to perform:

joining at least two online meetings using a same user account in an online meeting client, wherein the at least two online meetings comprise a first online meeting and a second online meeting;

determining a presentation mode corresponding to each of the at least two online meetings, the presentation mode comprising at least one of a visual mode and an audio mode; and presenting meeting content of each online meeting, and no more than one of the at least two online meetings presenting in the audio mode, comprising:

presenting a first meeting content of the first online meeting in full screen in a meeting interface based on the presentation mode corresponding to the first online meeting;

in response to the second online meeting, which the same user account participates in simultaneously with the first online meeting, satisfying a preset condition, updating the meeting interface that presents the first meeting content of the first online meeting by overlaying, on top of a part of the first meeting content in the meeting interface, a second meeting content of the second online meeting as a notification, wherein the meeting interface further comprises a meeting identifier of the second online meeting; and in response to a selection operation on the meeting identifier while overlaying the second meeting content as the notification, switching to the second online meeting by presenting the second online meeting in full screen in the meeting interface.

9. The apparatus according to claim 8, wherein an online meeting corresponding to the audio mode in the at least two online meetings comprises any one or more of the following:

the first joined online meeting;

the last joined online meeting;

an online meeting designated or selected by a human-computer interaction operation;

an online meeting in which there is a speaker, the online meeting being the only meeting with a speaker at one instance;

an online meeting whose current meeting content comprises content of interest to the user account; and an online meeting whose current meeting content mentions a meeting attendee corresponding to the user account.

10. The apparatus according to claim 8, wherein the visual mode comprises at least one of:

displaying meeting material;

displaying a video of a meeting attendee;

displaying speech content text of a speaker in the online meeting, the speech content text being obtained by a speech-to-text transcription technology; or displaying conversation content of the online meeting.

11. The apparatus according to claim 8, wherein the at least one processor is further configured to perform:

presenting the meeting content of the second online meeting to the online meeting client based on the visual mode and the audio mode corresponding to the second online meeting in response to that the second online meeting meets the preset condition.

12. A non-transitory computer-readable storage medium, storing at least one computer program, the at least one computer program being loaded and executed by a processor to implement:

joining at least two online meetings using a same user account in an online meeting client, wherein the at least two online meetings comprise a first online meeting and a second online meeting;

determining a presentation mode corresponding to each of the at least two online meetings, the presentation mode comprising at least one of a visual mode and an audio mode; and presenting meeting content of each online meeting, and no more than one of the at least two online meetings presenting in the audio mode, comprising:

presenting a first meeting content of the first online meeting in full screen in a meeting interface based on the presentation mode corresponding to the first online meeting;

in response to the second online meeting, which the same user account participates in simultaneously with the first online meeting, satisfying a preset condition, updating the meeting interface that presents the first meeting content of the first online meeting by overlaying, on top of a part of the first meeting content in the meeting interface, a second meeting content of the second online meeting as a notification, wherein the meeting interface further comprises a meeting identifier of the second online meeting; and in response to a selection operation on the meeting identifier while overlaying the second meeting content as the notification, switching to the second online meeting by presenting the second online meeting in full screen in the meeting interface.

13. The method according to claim 1, wherein in response to the second online meeting satisfying the preset condition, the notification about the second meeting content of the second online meeting is presented as a display panel overlaid on top of the part of the first meeting content in the meeting interface.

14. The method according to claim 5, wherein overlaying, to the meeting interface, the second meeting content of the second online meeting as the notification comprises:

highlighting the content of interest or the meeting attendee in the second meeting content.

* * * * *